United States Patent
de Villiers

(10) Patent No.: US 11,210,662 B2
(45) Date of Patent: Dec. 28, 2021

(54) PAYMENT CONFIRMATION SYSTEM AND METHOD

(71) Applicant: Gelliner Limited, Douglas (IM)

(72) Inventor: David de Villiers, Ballito (ZA)

(73) Assignee: GELLINER LIMITED, Isle of Man (GB)

(*) Notice: Subject to any disclaimer, the term of this patent is extended or adjusted under 35 U.S.C. 154(b) by 244 days.

(21) Appl. No.: 15/352,515

(22) Filed: Nov. 15, 2016

(65) Prior Publication Data

US 2017/0140373 A1    May 18, 2017

(30) Foreign Application Priority Data

Nov. 17, 2015  (GB) .................................... 1520267

(51) Int. Cl.
*G06Q 20/38*  (2012.01)
*G06Q 20/20*  (2012.01)
(Continued)

(52) U.S. Cl.
CPC ....... *G06Q 20/3829* (2013.01); *G06Q 20/102* (2013.01); *G06Q 20/20* (2013.01); *G06Q 20/3276* (2013.01); *G06Q 2220/00* (2013.01)

(58) Field of Classification Search
CPC ............. G06Q 20/3089; G06Q 20/102; G06Q 20/3276; G06Q 20/20; G06Q 2220/00
See application file for complete search history.

(56) References Cited

U.S. PATENT DOCUMENTS 8,606,720 B1 * 12/2013 Baker .................... G06Q 20/00
                                                          705/64
9,608,970 B1 *  3/2017 Gehret .................... H04L 67/42
(Continued)

FOREIGN PATENT DOCUMENTS

EP       1199664 A2    4/2002
GB       2473485 A     3/2011
(Continued)

OTHER PUBLICATIONS

Ratnakar Sadasyula, What are the advantages of using Extensible Markup Language (XML)?, Jul. 12, 2012, Quora.com, https://www.quora.com/What-are-the-advantages-of-using-Extensible-Markup-Language-XML (Year: 2012).*
(Continued)

*Primary Examiner* — Jay Huang
*Assistant Examiner* — Courtney P Jones
(74) *Attorney, Agent, or Firm* — McDonnell Boehnen Hulbert & Berghoff LLP

(57) ABSTRACT

Disclosed herein are methods and apparatus related to making payments in response to payment requests. For example, a customer device can receive a payment request including billing information and information related to an encryption key. The customer device can obtain the billing information and the information related to the encryption key from the payment request. The customer device can receive an input related to initiating payment of the payment request. After receiving the input related to initiating payment, the customer device can generate a request to initiate payment that includes the information related to the encryption key. The customer device can send the request to initiate payment.

20 Claims, 12 Drawing Sheets

(51) Int. Cl.
*G06Q 20/32* (2012.01)
*G06Q 20/10* (2012.01)

(56) References Cited

U.S. PATENT DOCUMENTS

| | | | |
|---|---|---|---|
| 2002/0188845 A1 | 12/2002 | Henderson et al. | |
| 2003/0217005 A1 | 11/2003 | Drummond et al. | |
| 2005/0021480 A1 | 1/2005 | Haff et al. | |
| 2005/0203854 A1 | 9/2005 | Das et al. | |
| 2005/0226413 A1 | 10/2005 | Wada | |
| 2008/0091944 A1 | 4/2008 | Von Mueller et al. | |
| 2010/0332240 A1 | 12/2010 | Somuah et al. | |
| 2011/0125771 A1* | 5/2011 | Gladwin | G06F 3/067 707/758 |
| 2012/0209749 A1 | 8/2012 | Hammad et al. | |
| 2012/0316950 A1* | 12/2012 | LaPorte | G06Q 20/3276 705/14.33 |
| 2013/0073365 A1* | 3/2013 | McCarthy | G06Q 20/12 705/14.23 |
| 2013/0110607 A1 | 5/2013 | Basmajian et al. | |
| 2013/0124413 A1* | 5/2013 | Itwaru | G06Q 20/20 705/44 |
| 2013/0198519 A1* | 8/2013 | Marien | G06F 21/34 713/172 |
| 2013/0226813 A1 | 8/2013 | Voltz | |
| 2013/0262309 A1* | 10/2013 | Gadotti | G06Q 20/322 705/44 |
| 2013/0262317 A1 | 10/2013 | Collinge | |
| 2014/0172531 A1* | 6/2014 | Liberty | G06Q 20/3276 705/14.23 |
| 2014/0245002 A1* | 8/2014 | Hayward | H04L 63/0428 713/162 |
| 2014/0279560 A1 | 9/2014 | Pedersoli | |
| 2014/0289107 A1 | 9/2014 | Moshal | |
| 2015/0019433 A1* | 1/2015 | Leger | G06Q 20/322 705/44 |
| 2015/0019440 A1* | 1/2015 | Yang | G09C 5/00 705/65 |
| 2015/0052064 A1* | 2/2015 | Karpenko | G06Q 20/3829 705/71 |
| 2015/0248664 A1 | 9/2015 | Makhdumi et al. | |
| 2016/0132874 A1* | 5/2016 | Carrott | G06Q 20/385 705/71 |
| 2016/0162878 A1* | 6/2016 | Kramer | G06Q 20/208 705/39 |
| 2016/0302061 A1* | 10/2016 | Park | H04W 12/35 |
| 2016/0335620 A1* | 11/2016 | Lyons | G07F 7/00 |

FOREIGN PATENT DOCUMENTS

| | | |
|---|---|---|
| WO | 2004/072921 | 8/2004 |
| WO | WO2004/104765 A2 | 12/2004 |
| WO | 2012/151660 A1 | 11/2012 |
| WO | 2013/068719 A1 | 5/2013 |
| WO | 2015/062232 | 5/2015 |

OTHER PUBLICATIONS

Canadian Intellectual Property Office, Examination Report for CA Pat. App. No. 2,947,514, dated Aug. 4, 2017.
EMVCO, EMV Acquirer and Terminal Security Guidelines, Version 1.2, Apr. 2014.
EMVCO, EMV Integrated Circuit Card Specifiations for Payment Systems Book 1, Version 4.3, Nov. 2011.
EMVCO, EMV Integrated Circuit Card Specifiations for Payment Systems Book 2, Version 4.3, Nov. 2011.
EMVCO, EMV Integrated Circuit Card Specifiations for Payment Systems Book 3, Version 4.3, Nov. 2011.
EMVCO, EMV Integrated Circuit Card Specifiations for Payment Systems Book 4, Version 4.3, Nov. 2011.
EMVCO, EMV Issuer and Application Security Guidelines, Version 2.4, Apr. 2014.
EMVCO, EMV Payment Tokenisation Specification Technical Framework, Version 1.0, Mar. 2014.
IP Australia, Examination Report No. 1 for Australian Pat. App. No. 2016250408, dated Jun. 5, 2017.
UK Intellectual Property Office, Combined Search and Examination Report for GB Pat. App. No. GB1520267.4, dated Apr. 27, 2017.
IP Australia, Examination Report No. 2 for Australian Pat. App. No. 2016250408, dated Aug. 28, 2017.
UK Intellectual Property Office, Combined Search and Examination Report for GB Pat. App. No. GB1803037.9, dated Mar. 19, 2018.
European Patent Office, Extended European Search Report for European Pat. App. No 16199131.0, dated Apr. 20, 2017.
IP Australia, Examination Report No. 2 for Australian Pat. App. No. 2018200662, dated Feb. 28, 2019.
IP Australia, Examination Report No. 1 for Australian Pat. App. No. 2018200662, dated Dec. 5, 2018.
IP Australia, Examination Report No. 3 for Australian Pat. App. No. 2018200662, dated May 3, 2019.
Extended European Search Report dated Oct. 23, 2019 for European Patent Application No. 19189228.0 filed on Nov. 16, 2016.

* cited by examiner

PAYMENT CONFIRMATION SYSTEM AND METHOD

CROSS-REFERENCE TO RELATED APPLICATIONS

This application claims priority under 35 U.S.C. §119 to United Kingdom Patent Application No. 1520267.4 filed Nov. 17, 2015. United Kingdom Patent Application No. 1520267.4 is hereby incorporated by reference in its entirety for all purposes.

BACKGROUND

In order to carry out a payment transaction between a merchant and a customer, most secure payment systems in use today rely on the merchant having a secure card reader device (either magnetic stripe- or Electron/MasterCard/Visa-based), as well as an active connection to a transaction server. The merchant is responsible for conducting the payment transaction and for verifying whether the payment transaction has been successful. The customer need only present a payment card to the merchant and enter a personal identification number (or "PIN") on the merchant's card reader device.

The security of such payment systems is degraded when the merchant's connection to the transaction server is inactive or when the merchant's card reader is unable to make a connection to the transaction server.

The customer is required to implicitly trust the merchant's card reader device, which has complete access to the customer's payment card information such as customer name, card number, expiry date, and the like. Furthermore, the customer is required to enter the customer's PIN on a merchant card reader device that is not under the customer's control. For this reason, such devices pose a security risk to the customer if they are hacked or compromised in any way. While the merchant's card reader device may perform strict checks to verify the authenticity of the customer's payment card information, no verification of the authenticity of the merchant's card reader device is performed.

Merchant's payment devices are complex and are expensive to design and develop. In most cases, such payment devices require certification, which increases the cost of such devices.

An alternative model of a secure payment system provides for the customer to control the transaction by using the customer's own trusted device such as the customer's smartphone for example, instead of the merchant's card reader device. In this model, the customer is not required to provide sensitive information such as the customer's PIN, for example, to the merchant and is therefore less likely to be defrauded.

The alternative model, however, still requires some way for the merchant to verify whether the payment transaction has been successful. Traditionally, this has been achieved by means of a text message from the transaction server to the merchant's mobile phone or, alternatively, to the merchant's printer via a dedicated hardware device.

All of these payment verification methods rely on the merchant having some network connectivity, such as an active mobile phone or a reliable internet connection. These methods are costly and cumbersome to implement, and can be unreliable to use in a retail environment.

The applicant has appreciated the desirability of a simpler process than those described above for verifying payment transactions.

OVERVIEW

Example embodiments are described herein. In a first respect, an example embodiment takes the form of a method comprising: (i) receiving a first representation of billing information at a merchant device, wherein the merchant device comprises one or more of a point of sale (POS) device, an output device, a data analyser device, and an authentication device; (ii) parsing the first representation of the billing information to recover the billing information using the merchant device; (iii) generating a second representation of the billing information that additionally comprises information related to an encryption key using the merchant device, wherein the second representation includes a graphically encoded representation of the billing information and of the information related to the encryption key; and (iv) providing a scannable output of the merchant device, the scannable output comprising a display and/or a printout of the graphically encoded representation of the billing information and of the information related to the encryption key.

In a second respect, an example embodiment takes the form of a merchant device comprising a processor and a data storage device. The data storage device is configured to store at least computer-readable program instructions that, when executed by the processor, cause the merchant device to perform a method. The method comprises the merchant device: (i) receiving a first representation of billing information, wherein the merchant device further comprises one or more of a POS device, an output device, a data analyser device, and an authentication device; (ii) parsing the first representation of the billing information to recover the billing information; (iii) generating a second representation of the billing information that additionally comprises information related to an encryption key, wherein the second representation includes a graphically encoded representation of the billing information and of the information related to the encryption key; and (iv) providing a scannable output that comprises a display and/or a printout of the graphically encoded representation of the billing information and of the information related to the encryption key.

In a third respect, an example embodiment takes the form of a computer-readable medium configured to store instructions that, when executed by a processor of a merchant device, cause the merchant device to carry out a method. The method comprises the merchant device: (i) receiving a first representation of billing information, wherein the merchant device further comprises one or more of a POS device, an output device, a data analyser device, and an authentication device; (ii) parsing the first representation of the billing information to recover the billing information; (iii) generating a second representation of the billing information that additionally comprises information related to an encryption key, wherein the second representation includes a graphically encoded representation of the billing information and of the information related to the encryption key; and (iv) providing a scannable output that comprises a display and/or a printout of the graphically encoded representation of the billing information and of the information related to the encryption key.

In a fourth respect, an example embodiment takes the form of a method comprising: (i) scanning a display and/or a printout of a payment request comprising a graphically encoded representation of billing information and information related to an encryption key using a scanner of a customer device; (ii) decoding, by the customer device, the graphically encoded representation of billing information and information related to the encryption key to obtain the billing information and the information related to the encryption key; (iii) receiving, at the customer device, an input related to initiating payment; (iv) after receiving the input related to initiating payment, the customer device generating a request to initiate payment that comprises the information related to the encryption key; and (v) sending the request to initiate payment using the customer device.

In a fifth respect, an example embodiment takes the form of a customer device comprising a processor, a data storage device, and a scanner. The data storage device is configured to store at least computer-readable program instructions that, when executed by the processor, cause the customer device to perform a method. The method comprises the customer device: (i) scanning a display and/or a printout of a payment request comprising a graphically encoded representation of billing information and information related to an encryption key using the scanner; (ii) decoding the graphically encoded representation of billing information and information related to the encryption key to obtain the billing information and the information related to the encryption key; (iii) receiving an input related to initiating payment; (iv) after receiving the input related to initiating payment, generating a request to initiate payment that comprises the information related to the encryption key; and (v) sending the request to initiate payment.

In a sixth respect, an example embodiment takes the form of a computer-readable medium configured to store instructions that, when executed by a processor of a customer device, cause the customer device to carry out a method. The method comprises the customer device: (i) scanning a display and/or a printout of a payment request comprising a graphically encoded representation of billing information and information related to an encryption key using a scanner of the customer device; (ii) decoding the graphically encoded representation of billing information and information related to the encryption key to obtain the billing information and the information related to the encryption key; (iii) receiving an input related to initiating payment; (iv) after receiving the input related to initiating payment, generating a request to initiate payment that comprises the information related to the encryption key; and (v) sending the request to initiate payment.

In a seventh aspect, an example embodiment takes the form of a method comprising: (i) receiving a request to initiate payment at a transaction server, wherein the request to initiate payment comprises information identifying a payment instrument, information related to an encryption key, and billing information; (ii) after receiving the request to initiate payment, the transaction server attempting to conduct a payment transaction to make a payment utilizing the payment instrument, wherein the payment transaction is based on the billing information; (iii) determining whether the payment transaction was successful using the transaction server; and (iv) after determining that the payment transaction was successful, the transaction server: (a) creating a transaction success notification that includes one or more images indicating successful payment and a payment confirmation token including a digital signature, wherein the digital signature is based upon the information related to the encryption key, and (b) sending the transaction success notification.

In an eighth respect, an example embodiment takes the form of a transaction server comprising a processor and a data storage device. The data storage device is configured to store at least computer-readable program instructions that, when executed by the processor, cause the transaction server to perform a method. The method comprises the transaction server: (i) receiving a request to initiate payment, wherein the request to initiate payment comprises information identifying a payment instrument, information related to an encryption key, and billing information; (ii) after receiving the request to initiate payment, attempting to conduct a payment transaction to make a payment utilizing the payment instrument, wherein the payment transaction is based on the billing information; (iii) determining whether the payment transaction was successful; and (iv) after determining that the payment transaction was successful: (a) creating a transaction success notification that includes one or more images indicating successful payment and a payment confirmation token including a digital signature, wherein the digital signature is based upon the information related to the encryption key, and (b) sending the transaction success notification.

In a ninth respect, an example embodiment takes the form of a computer-readable medium configured to store instructions that, when executed by a processor of a transaction server, cause the transaction server to carry out a method. The method comprises the transaction server: (i) receiving a request to initiate payment, wherein the request to initiate payment comprises information identifying a payment instrument, information related to an encryption key, and billing information; (ii) after receiving the request to initiate payment, attempting to conduct a payment transaction to make a payment utilizing the payment instrument, wherein the payment transaction is based on the billing information; (iii) determining whether the payment transaction was successful; and (iv) after determining that the payment transaction was successful: (a) creating a transaction success notification that includes one or more images indicating successful payment and a payment confirmation token including a digital signature, wherein the digital signature is based upon the information related to the encryption key, and (b) sending the transaction success notification.

In a tenth aspect, a system may include various means for carrying out each of the operations of any of the first, second, third, fourth, fifth, sixth, seventh, eighth, and/or ninth aspects.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the disclosure

BRIEF DESCRIPTION OF THE DRAWINGS

Example embodiments are described herein with reference to the drawings, in which.

DETAILED DESCRIPTION

I. Introduction

This description describes, among other things, example embodiments with respect to making one or more payments in response to one or more payment requests (or more simply, one or more "bills") for payment at a merchant establishment. In this description, the articles "a" or "an" are used to introduce elements of the example embodiments. The intent of using those articles is that there is one or more of the elements. The intent of using the conjunction "or" within a described list of at least 2 terms is to indicate that any of the listed terms or any combination of the listed terms. The terms "first" and "second" are used to distinguish respective elements and are not used to denote a particular order of those elements.

The following abbreviations or acronyms are used in the description:

Analyser App—Data Analyser Application Program;
Authentication App—Authentication Application Program;
CVC—Card Verification Code;
ECDSA—Elliptical Curve Digital Signature Algorithm;
FIG.—Figure;
FIGs.—Figures;
PIN—Personal Identification Number;
QR—Quick Response; and
Scanner App—Scanner Application Program.

II. Example Architecture

Figure 1:
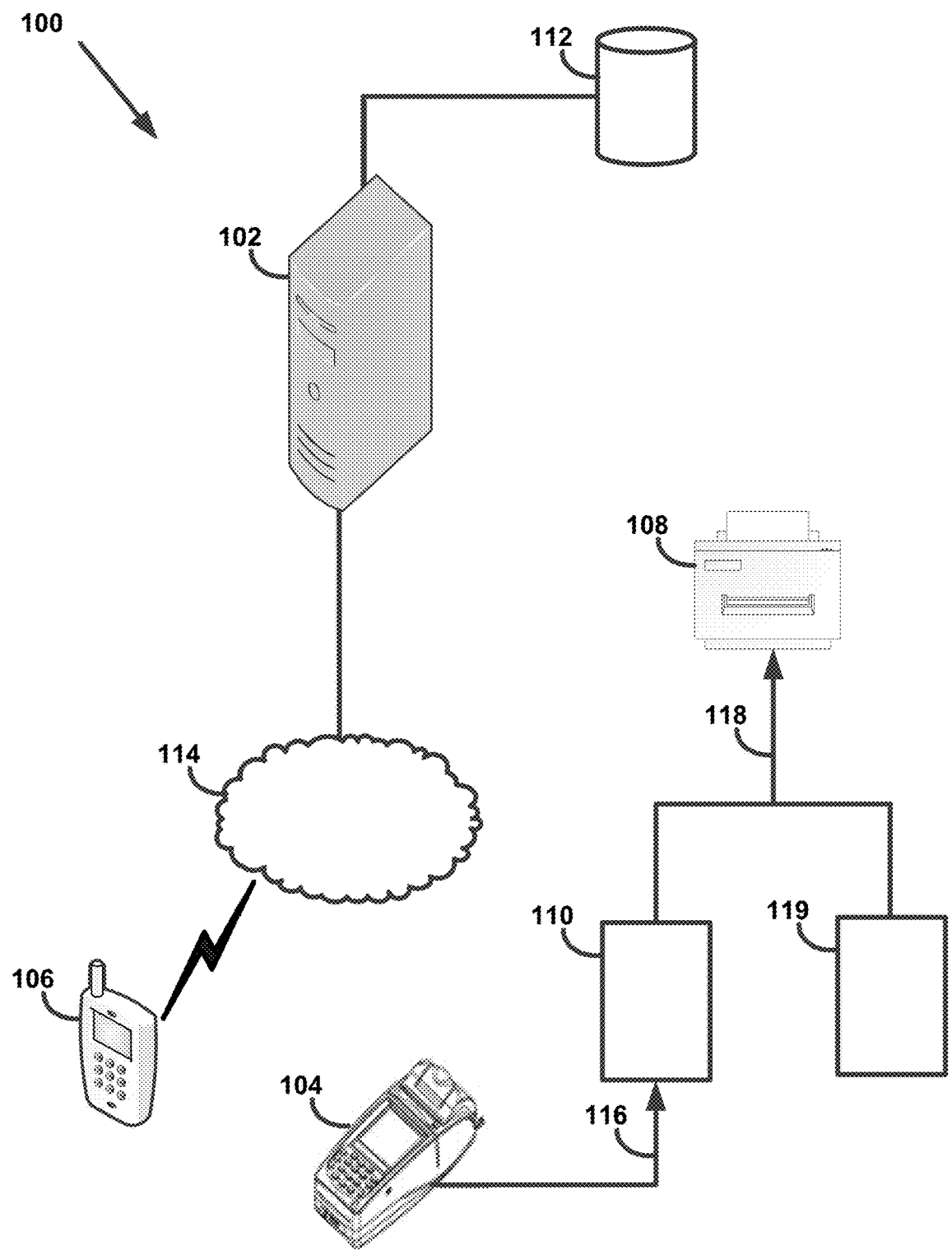
FIG. 1 is a schematic representation of a system for verifying payment transactions.

FIG. 1 depicts a schematic representation of a system 100 for verifying payment transactions in accordance with example embodiments described herein. The system 100 includes a transaction server 102, a POS device 104, a computing device 106, an output device 108, a data analyser device 110, database 112, and an authentication device 119.

The computing device 106 is configured to detect (e.g. scan) and decode a non-textual representation of data. The non-textual representations of data can be graphically encoded, such as being encoded graphically as a one-dimensional barcode (or, more simply, a "barcode" or a "1D barcode") or a two-dimensional matrix barcode (or, more simply, a "2D matrix barcode" or a "2D matrix code"). A 2D matrix code can include, but is not limited to, a data matrix code that conforms to an International Organisation for Standardisation (ISO) standard, such as the ISO 16022.2006 standard (Information Technology—Automatic Identification and Data Capture Techniques—QR code 2005 bar code symbology specification), also known as a Quick Response code (or more simply a "QR code") readable by a QR CODE® barcode scanner, or some other type of 2D matrix code. The computing device 106 can take the form of a conventional smartphone handset provisioned with software for scanning QR codes, a web browser, and software and/or hardware for one or more connections to one or more networks, such as, but not limited to, one or more of: the Internet, a wide area network (WAN), a local area network (LAN), a wired network, and a wireless network.

The computing device 106 can include or take the form of a conventional smartphone handset provisioned with software for (i) detecting 1D barcodes and/or 2D matrix codes or other graphically-encoded and/or non-textual representations of data, (ii) a web browser, and (iii) maintaining one or more wireless and/or wired network connections, such as a connection to the Internet. The computing device 106 can be referred to as a "mobile wireless communication device," a "mobile computing device", a "mobile smartphone handset" or, more simply, a "mobile smartphone" or "smartphone." As an example, the mobile wireless communication device can be, or include, a personal digital assistant, a tablet computer, a laptop computer, or a cellular telephone.

The transaction server 102 and the computing device 106 can communicate with each other using a communication network 114. The communication network 114 can comprise a wide-area network, such as the Internet. The data analyser device 110 can communicate with the POS device 106 and with the output device 108 by means of communication channels 116 and 118, respectively. The authentication device 119 can communicate with the output device 108 by means of communication channel 118. The communication channels 116 and 118 can be wired or wireless serial communication channels, among other possibilities.

Communication between the transaction server 102 and the computing device 106 can be facilitated by using a server-hosted program (not shown) that is installed and executed on the server 102 and a scanner application program (a 'scanner app') that is installed and executed on the computing device 106. Communication between the transaction server 102 and computing device 106 can occur using network interface 152 (shown in FIG. 3) and network interface 184 (shown in FIG. 6).

The computing device 106 can download a copy of the scanner app from a download repository (e.g., the data storage device 194 in FIG. 6) and install the scanner app 164 (shown in FIG. 3) on the computing device 106. During, or after, installation, the scanner app may create a user profile 120 (shown in FIG. 3) on the computing device 106 (e.g., within data storage device 158) and provides a prompt (e.g., by means of user interface 154 (shown in FIG. 3)) to provide data representing personal attributes such as, the user's first name, the user's last name, an e-mail address, a physical address and particulars of one or more payment instruments such as credit cards, debit cards, e-wallets and the like. In accordance with at least some example embodiments, the user profile 120 (e.g., the data in the user profile 120) is stored locally on the computing device 106 and is not stored on the transaction server 102. In other examples, the transaction server stores a user profile 198 that is synchronised with the user profile 120 stored by the computing device 106. That is, when changes are made to the user profile 120 stored by the computing device 106, those changes are provided as updates to the user profile 198 stored on the transaction server 102. The updates may be provided whenever changes to the user profile 120 occur, periodically, or based on inputs received by the computing device 106. This allows for the user profile to be preserved in the event that the computing device 106 malfunctions, or is destroyed. Data transmission between the transaction server 102 and the computing device 106 may be encrypted.

POS device 104 may be used by a merchant to generate bills for customers of the merchant's business establishment. In one embodiment, the merchant's business establishment is a restaurant and a user of the computing device 106 is a diner at the restaurant. The merchant's business establishment may be configured for bill payment via 2D matrix codes or other graphically-encoded and/or non-textual representations.

In this disclosure the terms 'user' and 'customer' are used interchangeably depending on the context. For example a user of the scanner app 164 on the computing device 106 can also be a customer of the merchant.

Figure 2:
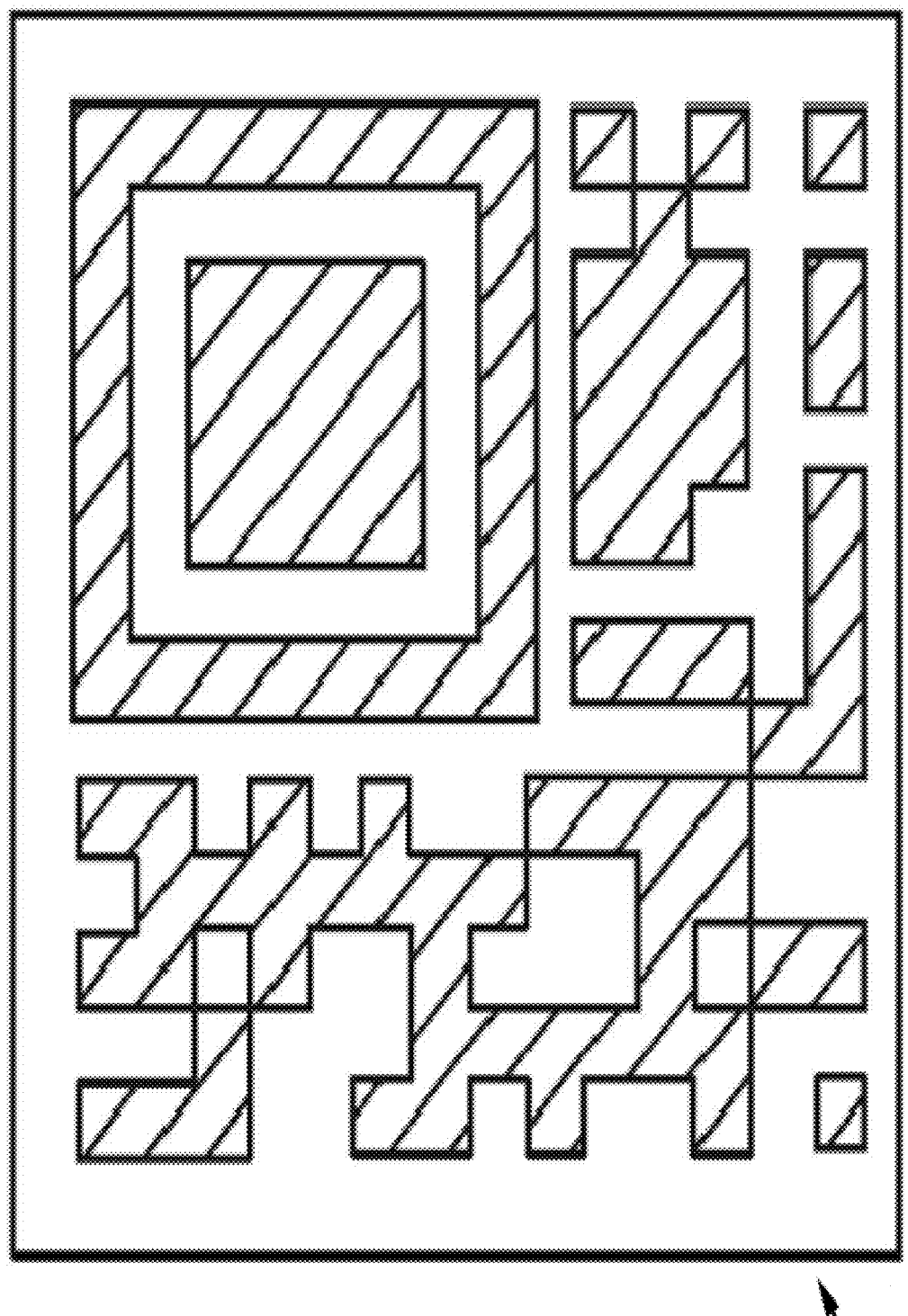
FIG. 2 illustrates an example quick response (QR) code.

Next, FIG. 2 illustrates an example non-textual, graphically-encoded representation 999 (e.g., a 2D matrix code or QR code). Depending on the form of output device 108 of FIG. 1, the non-textual, graphically-encoded representation 999 may be printed on paper by the output device 108 or displayed on a display screen of the output device 108. In either electronic or paper form, the non-textual, graphically-encoded representation 999 may be provided to a user or customer to be scanned with the computing device 106 to initiate payment of a bill.

Figure 3:
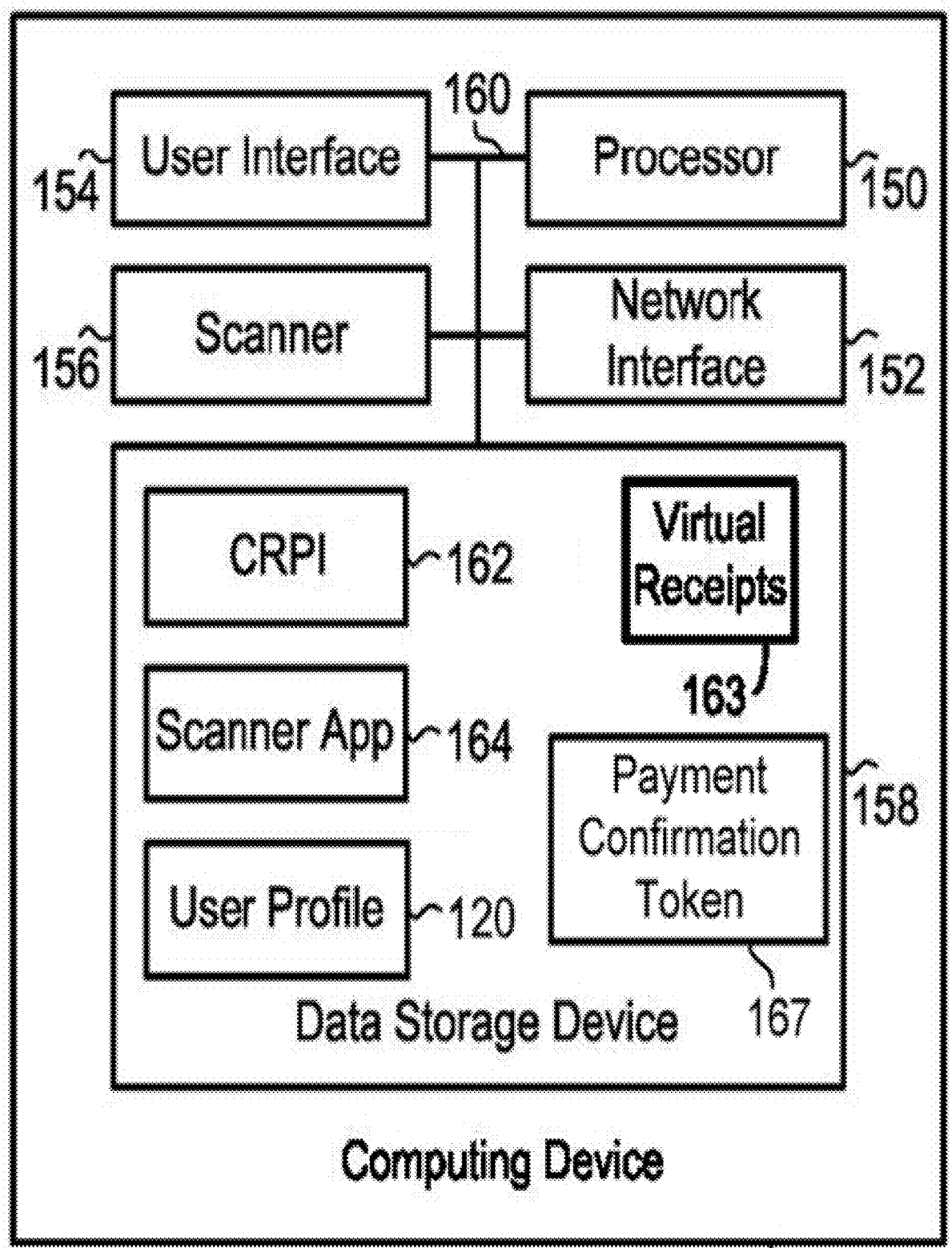
FIG. 3 is a block diagram of a computing device in accordance with an example embodiment.

Next, FIG. 3 is a block diagram depicting an example embodiment of computing device 106. As shown in FIG. 3, computing device 106 includes (i) a processor 150, (ii) a network interface 152 for transmitting and/or receiving data from communication network 114, (iii) a user interface 154, (iv) a scanner 156 configured to scan (e.g., capture or detect) 2D matrix codes or other graphically-encoded and/or non-textual representations of data, and (v) a data storage device 158, all of which can be linked together via a system bus or other connection mechanism 160. In some embodiments, scanner 156 include one or more cameras configured to capture images of at least 1D barcodes, 2D matrix codes, and/or other graphically-encoded and/or non-textual representations of data, barcode scanners, QR scanners, or combinations thereof. Data storage device 158 may include computer-readable program instructions (CRPI) 162, the scanner app 164, and a user profile 120. In some examples, CRPI 162 can include the scanner app 164. Data storage device 158 can comprise a non-transitory computer-readable storage medium readable by processor 150.

Data storage device 158 may include virtual receipts 163. The virtual receipts 163 may include successful virtual receipts. A successful virtual receipt can include data representing one or more images indicating successful payment of a bill issued by a merchant. For example, the one or more images may represent and/or include receipt information such as at least one of (i) a bill identifier and/or reference number, (ii) a merchant identifier, (iii) an employee identifier, (iv) a location identifier, (v) an itemization of the bill, (vi) a transaction amount, (vii) a transaction date, (viii) an amount paid via a payment instrument associated with the computing device 106 to a payment instrument associated with the merchant, (ix) payment confirmation information, and/or (x) a table identifier. In this manner, a user may accumulate one or more such images (e.g., virtual receipts) on the user's computing device 106, thereby avoiding the need to collect paper receipts. The user interface 154 may be configured to display the images (e.g., virtual receipts) using a display screen.

In some examples, the virtual receipts 163 may include unsuccessful virtual receipts. An unsuccessful virtual receipt can include data representing one or more images indicating unsuccessful payment of the bill. Such unsuccessful virtual receipts can include information some or all of the above-mentioned receipt information and/or information indicating a reason or reasons for unsuccessful payment; e.g., insufficient funds, incorrect identification of a payment instrument, payment system and/or network failures inhibiting payment.

Data storage device 158 may also include payment confirmation tokens 167. A payment confirmation token may include data representing information pertaining to a successful payment transaction for payment of a bill issued by a merchant. For example, such information may include some or all of the above-mentioned receipt information discussed above with respect to virtual receipts 163.

Each computer-readable storage medium (or, more simply "readable medium") described in this disclosure can include a non-transitory computer-readable medium that includes volatile and/or non-volatile storage components such as optical, magnetic, organic or other memory or disc storage, which can be integrated in whole or in part with a processor. Additionally or alternatively, each computer-readable medium described in this disclosure can include a transitory computer-readable medium. The transitory computer-readable medium can include, but is not limited to, a communications medium such as a digital or analogue communications medium (e.g., a fibre optic cable, a waveguide, a wired communication link, or a wireless communication line).

Each processor described herein can comprise one or more general purpose processors (e.g., INTEL single core microprocessors or INTEL multicore microprocessors) or one or more special purpose processors (e.g., application-specific integrated circuits (ASICs), graphics processing units (GPUs), field-programmable gate arrays (FPGAs), and/or digital signal processors (DSPs)). Processor 150 is or can be configured to execute CRPI 162.

A network interface, such as network interface 152 or any other network interface disclosed herein, can include an interface to one or more networks and/or communication channels. For example, the network interface can include one or more transmitters configured for transmitting data using the one or more networks and/or communication channels, one or more receivers configured for receiving data using the one or more networks and/or communication channels, and/or one or more transceivers configured to both transmit and receive data using the one or more networks and/or communication channels.

The network interface may further include one or more receivers configured to receive data transmitted over the network or communication channel from another device within or on the network or communication channel. Any of the network interfaces disclosed herein can include circuitry, for example electronic circuitry, for converting data received from the network or communication channel to data that can be provided to a processor for processing the received data. For example, the circuitry of the network interfaces can include a modulator and/or demodulator (modem). Any of the network interfaces disclosed herein can include circuitry, for example electronic circuitry, for converting data received from another device, such as a processor or a computer-readable medium, to data in a form that can be transmitted over a network or communication channel.

Figure 4:
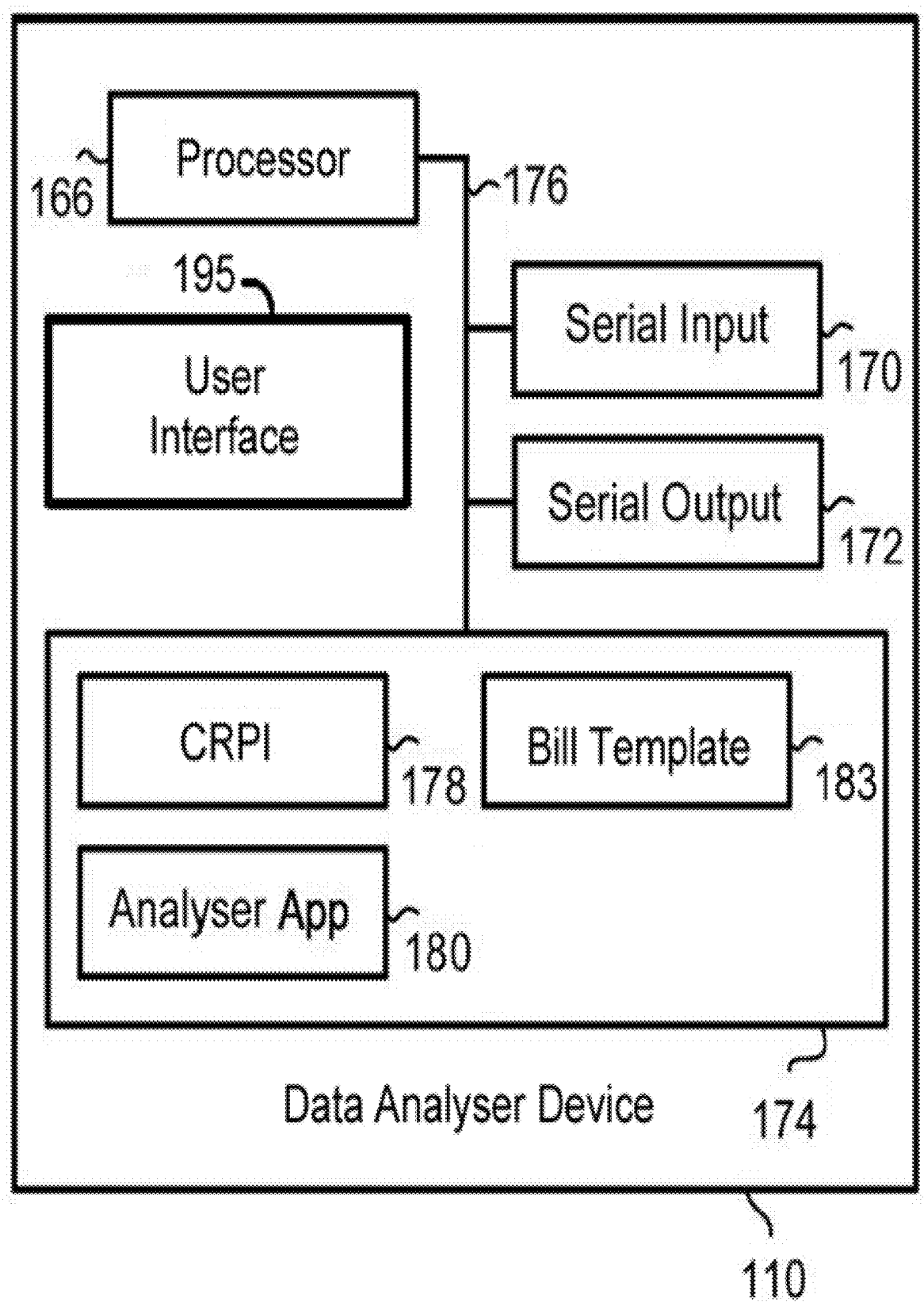
FIG. 4 is a block diagram of a data analyser device in accordance with an example embodiment.

Next, FIG. 4 is a block diagram depicting an example embodiment of data analyser device 110. As shown in FIG. 4, data analyser device 110 can include (i) a processor 166, (ii) an input communication port 170 for receiving a serial bit stream from communication channel 116, (iii) an output communication port 172 for transmitting a serial bit stream to communication channel 118, and (iv) a data storage device 174, all of which can be linked together via a system bus or other connection mechanism 176. Data storage device 174 can include (i) CRPI 178, (ii) an analyser application program (an 'analyser app') 180 that is installed on the data analyser device, and (iii) one or more merchant bill templates 183. For example, a bill template 183 can be formatted using one or more markup languages, such as eXtended Markup Language (XML), HyperText Markup Language (HTML), and/or another markup language.

CRPI 178 can include the analyser app 180. Data storage device 174 can comprise a computer-readable storage medium readable by processor 166. Processor 166 is or can be configured to execute CRPI 178. In other instances, input 170 and output 172 communication ports may comprise any single or multiple ports configured to engage in serial or non-serial (e.g., parallel) communication via channels 116 and 118. In some examples, the data analyser device 110 may include a user interface 195 configured to receive user inputs and provide outputs. For example, the user interface 195 may include a touchscreen or a display screen suitable for displaying a graphically-encoded and/or non-textual representation (e.g., a 2D matrix code).

Figure 5:
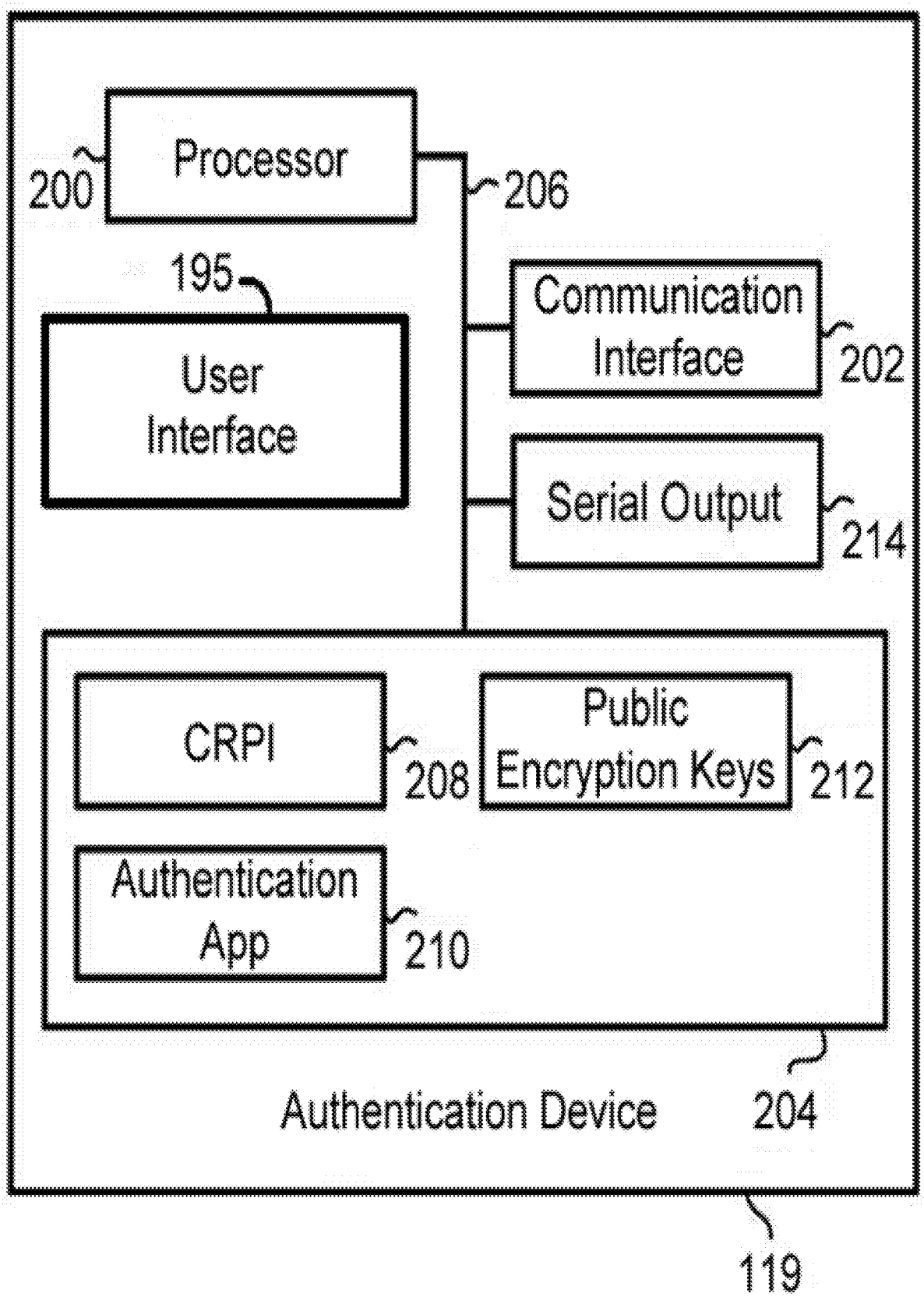
FIG. 5 is a block diagram of an authentication device in accordance with an example embodiment.

Next, FIG. 5 is a block diagram depicting an example embodiment of authentication device 119. As shown FIG. 5, authentication device 119 can include (i) a processor 200, (ii) a communication interface 202, (iii) an output communication port 214 for transmitting a serial bit stream to communication channel 118, and (iv) a data storage device 204, all of which can be linked together via a system bus or other connection mechanism 206. Data storage device 204 can include (i) CRPI 208, (ii) an authentication application program (an 'authentication app') 210, and (iii) one or more public encryption keys 212. CRPI 208 can include the authentication app 210. Data storage device 206 can comprise a computer readable storage medium readable by processor 200. Processor 200 is or can be configured to execute CRPI 208. Output communication port may comprise any single or multiple ports configured to engage in serial or non-serial (e.g. parallel) communication with communication channel 118. In some examples, communication interface 202 may be any one or more of (i) an audio communication interface, (ii) a Bluetooth interface, (iii) an NFC interface, or (iv) a Wi-Fi interface. In some examples, authentication device 119 may include a user interface 195 configured to receive user inputs and to provide outputs. For example, the user interface 195 may include a touchscreen.

In some embodiments, part or all of the functionality of POS device 104, output device 108, data analyser device 110, and/or authentication device 119 can be merged. As one example, POS device 104 can further include some or all of the herein-described functionality of output device 108, data analyser device 110, and/or authentication device 119. Other examples of merging functionality between POS device 104, output device 108, data analyser device 110, and/or authentication device 119 are possible as well.

Figure 6:
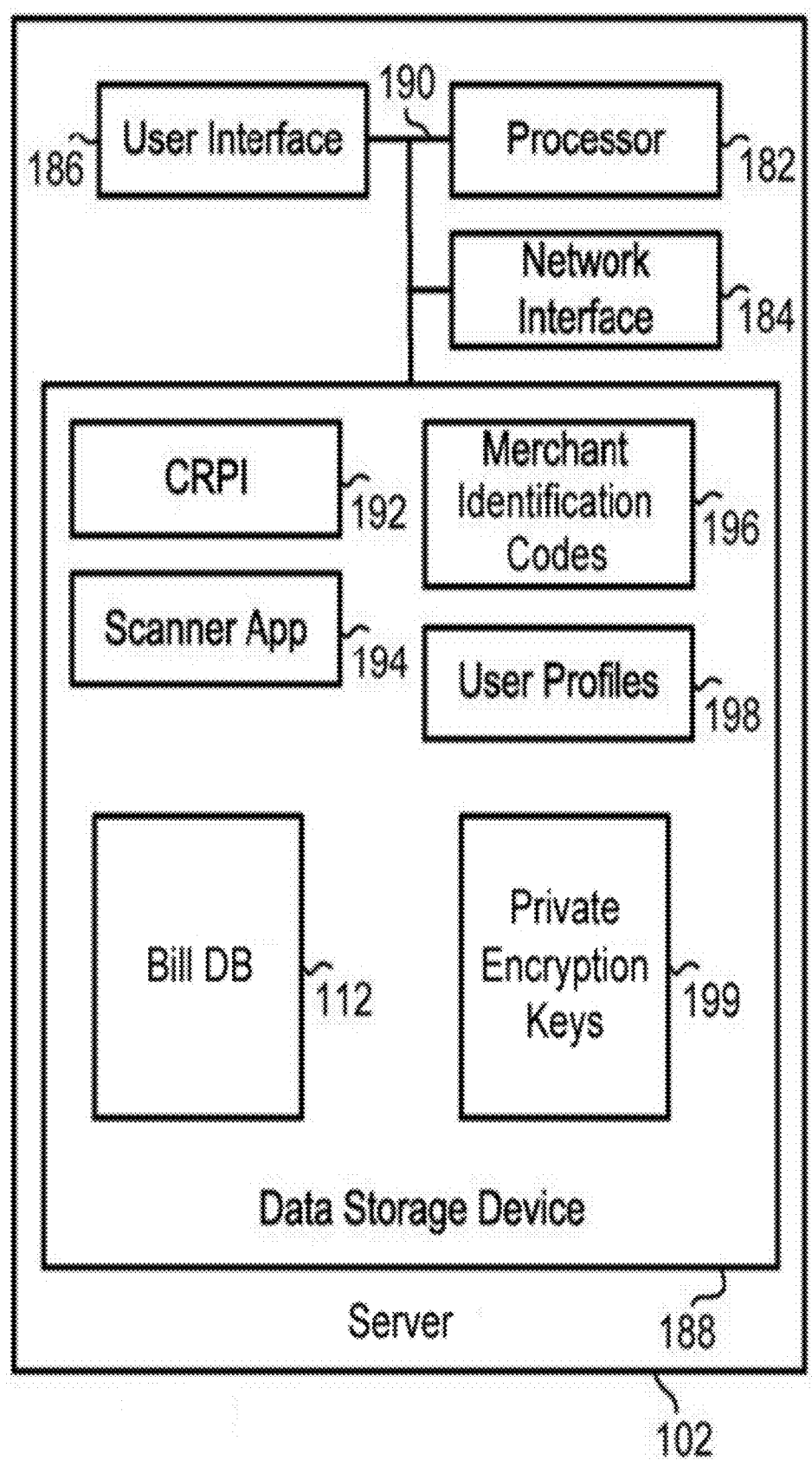
FIG. 6 is a block diagram of a transaction server in accordance with an example embodiment.

Next, FIG. 6 is a block diagram depicting an example embodiment of transaction server 102. As shown in FIG. 6, transaction server 102 can include (i) a processor 182, (ii) a network interface 184 for transmitting and/or receiving data using communication network 114, (iii) a user interface 186, and (iv) a data storage device 188, all of which can be linked together via a system bus or other connection mechanism 190. Data storage device 188 can include (i) CRPI 192, (ii) the scanner app 194 for downloading to computing device 106, (iii) merchant identifier codes for merchant businesses, (iv) user profiles 198, (v) bill database 112, and (vi) a list of private encryption keys 199. Each public encryption key 212 in the authentication device 119 can correspond to a matching private encryption key 199 in the transaction server 102. CRPI 192 can include the scanner app 194. Data storage device 188 can comprise a non-transitory computer-readable storage medium readable by processor 182. Processor 182 is configured to execute CRPI 192. In some examples, the transaction server 102 may include multiple networked computing devices configured to perform any functionality attributed to the transaction server 102 in this disclosure.

III. Example Operation

The system 100 can be used to register and pay a bill at a merchant business by use of the computing device 106. The following example describes an application of the system 100 by a user (e.g. a diner) at a restaurant who wishes to pay a restaurant bill after completion of a meal. In addition to this particular example, the system 100 is also applicable to payment of any bill that is generated on a POS device 104 associated with any type of merchant. The merchant (restaurant proprietor or manager) may have registered and have been assigned a merchant identifier by the transaction server 102. The merchant identifier may be stored on any of the transaction server 102, the POS device 104 and the data analyser device 110.

Figure 7:
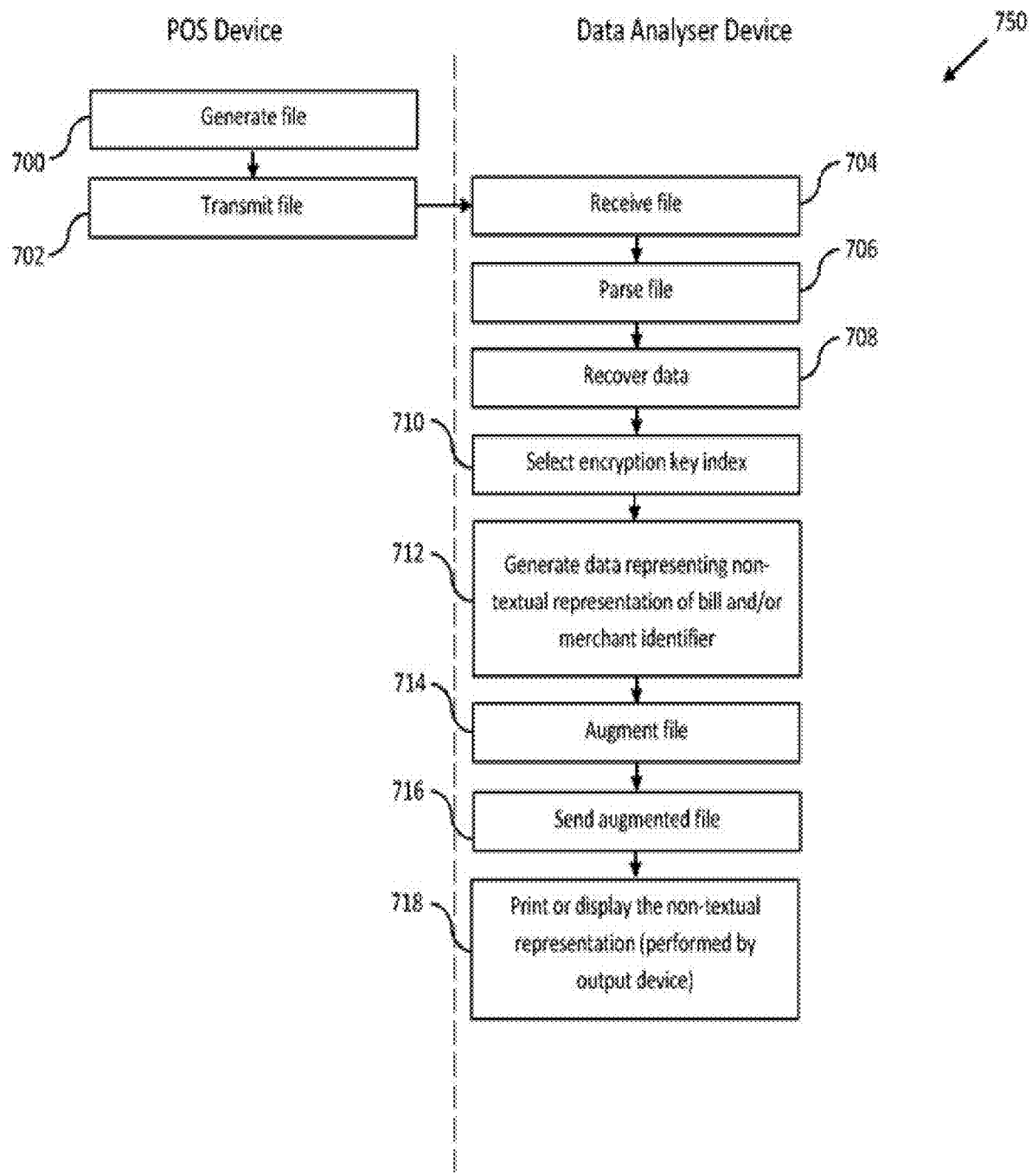
FIG. 7 is a flow chart of functions to carry out bill payment in accordance with an example embodiment of the system of FIG. 1.

FIG. 7 is a flow chart depicting a set of functions 750 that can be carried out in accordance with an example embodiment. The set of functions 750 can be performed to generate and/or pay a bill from a merchant. The set of functions 750 are shown within blocks 700 through 718. A description of those blocks now follows.

Upon completion of a meal (or consumption of another good or service) the user can request a bill for payment from an employee of the merchant. The employee can produce the bill by providing inputs to the POS device 104. The provided inputs may represent, for example, billing information that includes one or more of a merchant identifier identifying the merchant, a bill identifier identifying the bill, a location identifier identifying a location associated with the merchant (e.g., a physical address or a store number), an employee identifier identifying an employee of the merchant (e.g., a waitperson), a table identifier identifying a table where the user/customer is sitting, an itemisation of the bill, any tax such as sales tax or value-added tax included in the bill, and a total amount due. In some examples, instead of the employee providing input representing the bill identifier, the location identifier, the tax added to the bill, or the total amount due, that information may be (i) stored in the POS device 104, or (ii) otherwise accessible to the POS device 104 and added to the bill without reference to input provided by the employee to the POS device 104. Generally, any identifier mentioned above may include any numeric, alphanumeric or alphabetic data that identifies a corresponding object (e.g., is recognisable by the server 102, the computing device 106 or the POS device 104 as identifying the corresponding object).

At block 700, POS device 104 can generate a file that contains the billing information, which can include one or more of (i) a bill identifier, (ii) a merchant identifier, (iii) an employee identifier, (iv) a location identifier, (v) information about goods and/or services being billed, such as an itemisation of the bill, (vi) an amount due corresponding to the bill, and (vii) a table identifier.

The data of the generated file may be formatted or arranged in accordance with a bill template 183 stored on POS device 104 or the data analyser device 110. The generated file may include any data representing a textual (e.g., alphanumeric) representation of the bill from the merchant. In some examples, the file may further include data representing imagery related to the merchant (e.g., a merchant's logo) and/or a graphically-encoded (non-textual) representation of the billing information.

At block 702 the POS device 104 may then send the generated file to the data analyser device 110 via an output port (not shown) of the POS device 104 and communication channel 116.

At block 704, the data analyser device 110 may receive the file using serial input port 170 (or a non-serial port of the data analyser device 110).

At block 706 the data analyser device 110 may execute the analyser app 180 in data storage device 174 to parse the received file (perhaps with reference to the bill template 183) to recover, at block 708, data representing the bill corresponding to various data fields of the file related to billing information, such as the above-mentioned billing information discussed above in the context of block 700. As one example, the analyser app 180 can parse a formatted file, such as a file formatted using an eXtended Markup Language (XML) or using another formatting technique and/or formatted using a bill template 183, to retrieve a textual representation of the billing information. As another example, the analyser app 180 can parse the received file by decoding a graphically-encoded and/or non-textual representation of the billing information to retrieve a textual representation of the billing information. Still other examples of parsing the received file to retrieve a textual (or other) representation of the billing information are possible as well.

At block 710, the analyser app 180 of the data analyser device 110 may select an encryption key index identifying a key pair that includes a public encryption key and a corresponding private encryption key. The key pair can be used by transaction server 102 and authentication device 119 to digitally sign and to verify, respectively, data pertaining to a payment transaction in settlement of the bill. For example, suppose the authentication device 119 contains a set of N (N>0) public encryption keys such as public encryption keys 212, each associated with a corresponding private encryption key on the transaction server 102.

Then, an encryption key index may be an integer from 1 to N, where an encryption key index of 1 indicates a first of the N public/private encryption key pairs, an encryption key index of 2 indicates a second of the N public/private encryption key pairs, and so on, until reaching an encryption key index of N indicating the $N^{th}$ (last) of the N public/private encryption key pairs. Then the encryption key index can associate a particular public encryption key of the N public encryption keys with a corresponding private encryption key of a set of N private encryption keys, such as private encryption keys 199. For example, let the N public encryption keys be {Pub1, Pub2, . . . PubN}, where Pub1 is the public encryption key of the N public encryption keys indexed by an encryption key index of 1, Pub2 is the public encryption key indexed by an encryption key index of 2, and so on, until PubN is the public encryption key indexed by an encryption key index of N. Also, let the N private encryption keys be {Priv1, Priv2, . . . PrivN}, where Priv1 is the private encryption key of the N private encryption keys indexed by an encryption key index of 1, Priv2 is the private encryption key indexed by an encryption key index of 2, and so on, until PrivN is the private encryption key indexed by an encryption key index of N. Then, the key pair (Pub1, Priv1) can be associated with the encryption key index of 1, the key pair (Pub2, Priv2) can be associated with the encryption key index of 2, and so on, until key pair (PubN, PrivN) can be associated with the encryption key index of N.

In one example, the encryption key index may be selected randomly by the data analyser device 110; that is, the selected encryption key index can be a randomly selected integer between 1 and N. As another example, the encryption key index may be selected using another selection technique by the data analyser device 110; that is, the selected encryption key index can be selected using a round-robin technique, a least-recently-used technique, a most-recently used technique, a selection technique based on a hash value calculated using a hash function operating on some of all of the billing information, or some other selection technique.

At block 712, the data analyser device 110 may generate data representing a graphically-encoded and/or non-textual representation of the bill, the merchant identifier and the selected encryption key index. The graphically-encoded and/or non-textual representation can be based on the contents of the received file. For example, the graphically-encoded and/or non-textual representation can include one or more 1D barcodes and/or 2D matrix codes (not shown) that encode some or all data representing the bill, the merchant identifier and the selected encryption key index. As another example, the graphically-encoded and/or non-textual representation generated by the data analyser device 110 may include at least one of (i) a two-dimensional image and (ii) a two-dimensional matrix code, such as a Quick Response (QR) code. Other examples of graphically encoding and/or non-textually representing data, such as some or all of the data representing the bill, the merchant identifier and the selected encryption key index, are possible as well.

The data analyser device 110 may then, at block 714, augment at least a portion of the received file to include the data representing the graphically-encoded and/or non-textual representation of the bill, the merchant identifier and the selected encryption key number. The graphically-encoded and/or non-textual representation may encode or otherwise represent some or all of the billing information and perhaps the selected encryption key number. Examples of billing information include, but are not limited to: (i) the bill identifier, (ii) the employee identifier, (iii) the location identifier, (iv) the itemisation of the bill, (v) the amount due corresponding to the bill, and (vi) the table identifier.

At block 716, the data analyser device 110 may then send the augmented file away from the data analyser device 110 to the output device 108 by means of serial output port 172 (or a non-serial port), via communication channel 118.

At block 718, the output device 108 may produce a printout and/or a display of the graphically-encoded and/or non-textual representation and/or the augmented file. In one example, the output device 108 can include a printer that may print the graphically-encoded and/or non-textual representation, possibly along with other text or images associated with the bill according to the merchant's bill template 183. In another example, the output device 108 includes a display screen that may be used to display the graphically-encoded and/or non-textual representation to the user (perhaps with other text or images of the augmented file). Other outputs of the graphically-encoded and/or non-textual representation and/or the augmented file are possible as well. In some embodiments, output of output device 108 at block 718, e.g., the printout and/or a display of the graphically-encoded and/or non-textual representation and/or the augmented file, can be scannable. That is, a scanner, such as scanner 156, or similar device may be able to scan a scannable output of output device 108 to retrieve data encoded or otherwise represented by the scannable output.

Figure 8:
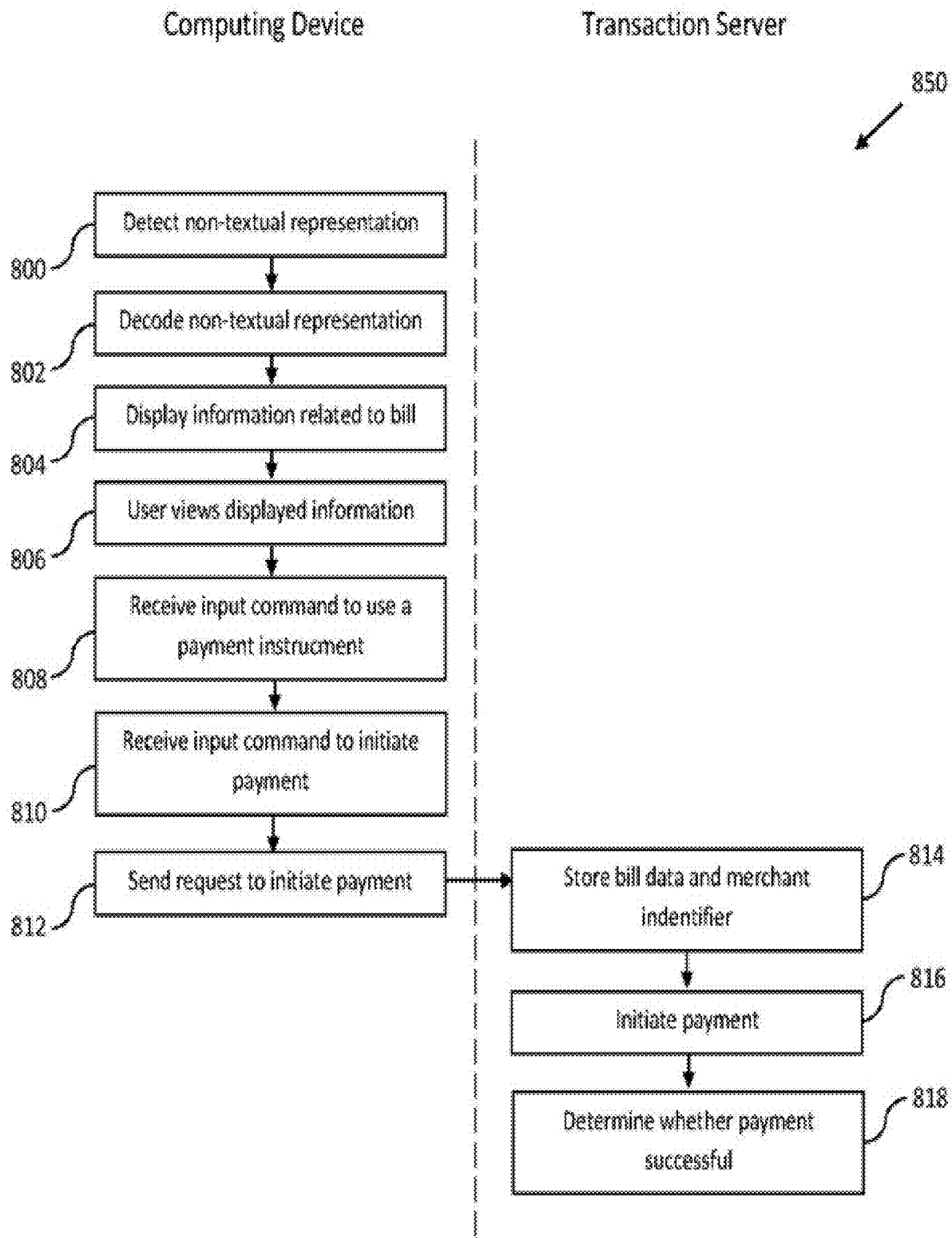
FIG. 8 is a flow chart of functions to carry out bill payment in accordance with an example embodiment of the system of FIG. 1.

FIG. 8 is a flow chart depicting a set of functions 850 that can be carried out in accordance with an example embodiment. The set of functions 850 can be performed to pay a bill that includes a 2D matrix code that represents the bill, a corresponding merchant identifier and an encryption key index. The set of functions 850 is shown within blocks 800 through 818.

At block 800, the computing device 106 may execute scanner app 164. Scanner app 164 can use scanner 156 to scan, detect, and/or receive a graphically-encoded and/or non-textual representation of: billing information and information related to an encryption key. In some embodiments, the graphically-encoded and/or non-textual representation can represent some or all of the billing information discussed above in the context of block 700 and the encryption key index. In particular of these embodiments, the graphically-encoded and/or non-textual representation can represent: (i) a bill from a merchant and/or (ii) a merchant identifier and/or (iii) information related to an encryption key, such as an encryption key index for the encryption key.

In one example, the graphically-encoded and/or non-textual representation may be, or be similar to, the non-textual, graphically-encoded representation 999 of FIG. 2 (e.g., a 2D matrix code). The graphically-encoded and/or non-textual representation may be printed by output device 108 onto a paper copy of the bill or displayed by a display screen of the output device 108. The graphically-encoded and/or non-textual representation may be generated in conjunction with the data analyser device 110 augmenting at least a portion of a file received by the data analyser device 110 (e.g., from the POS device 104). The data representing the graphically-encoded and/or non-textual representation may include at least one of (i) a two-dimensional image and (ii) a two-dimensional matrix code, such as a Quick Response (QR) code. The file received by the data analyser device 110 may represent the bill or include data representing the bill. The augmented file may be sent from the data analyser device 110 to the output device 108.

At block 802, the scanner app 164 can decode the detected and/or received graphically-encoded and/or non-textual representation (e.g., the merchant identifier and/or data representing the bill and/or the encryption key index) using scanner 156. For example, the computing device 106 may use scanner 156 to scan a graphically-encoded and/or non-textual representation at block 800 and may execute a proprietary or open-source decoding algorithm to decode the graphically-encoded and/or non-textual representation at block 802. In some embodiments, the scanner app 164 can scan and decode the graphically-encoded and/or non-textual representation to obtain some or all of the billing information, the bill from a merchant, the merchant identifier, and the encryption key index discussed above in the context of block 800.

At block 804, the scanner app 164 (of the computing device 106) displays information related to the bill on a display of the user interface 154. The displayed information may include part or all the above-mentioned billing information, such as an itemisation of the bill (e.g., a list of items purchased and the respective costs of the purchased items), an amount of tax added to the bill, a gratuity fee added to the bill, a merchant identifier, a table identifier, an employee identifier, a location identifier, and a total amount due, among other possibilities.

At block 806, the user can view the displayed information related to the bill.

At block 808, the computing device 106 may receive input indicating a command to use a payment instrument to pay the bill. For example, the display of the user interface 154 may display icons or text representing one or more pre-loaded payment instruments, and user interface 154 may receive input indicating selection of one or more payment instruments. The computing device 106 may have information related to the one or more payment instruments stored at user profile 120. Or, the computing device 106 may receive inputs representing information related to a new payment instrument. In another example, the information related to the one or more payment instruments may be stored by data storage device 188 of transaction server 102.

At block 810, user interface 154 may receive input indicating acceptance of the bill for payment. This input can relate to initiating payment of the bill.

At block 812, the scanner app 164 (of the computing device 106) may then generate and send a payment request, to be received by the transaction server 102, to initiate payment of the total amount due corresponding to the bill. The request may include at least one of (i) the merchant identifier, (ii) the total amount due to be paid, (iii) a bill identifier corresponding to the bill, (iv) information related to a payment instrument associated with the computing device; e.g., the payment instrument selected at block 808, and (v) an encryption key index. The request may also include data representing graphically-encoded and/or non-textual representation of the bill, perhaps as a condensed version of data useful for facilitating payment. The merchant identifier and the bill identifier may include any numeric, alphabetic, or alphanumeric data that respectively identifies the merchant and the bill. The information related to the payment instrument associated with the computing device may include a credit or debit card number, a cardholder name, a card expiration date, a CVC, or a PIN, as stored in the user profile 120. In some examples, data related to the payment instrument associated with the computing device 106 is stored by, and retrieved from, data storage device 188 of the transaction server 102.

Next, at block 814, the transaction server 102 may then store the data representing the bill and/or the merchant identifier in the bill database 112 or elsewhere in data storage device 188.

At block 816, the transaction server 102 can attempt to conduct a payment transaction by initiating payment of the bill based on the payment request received from the computing device 106. To initiate payment, the transaction server 102 can send the data related to the payment to a third computing device (e.g., a payment processing system/server). The third computing device (not shown) may be configured to execute payments with a payment instrument associated with the computing device 106 or a user of the computing device 106. In some instances, initiating the payment may include the transaction server 102 retrieving data related to the payment instrument associated with the computing device 106 from data storage device 188. As an example, the data sent by the transaction server 102 to the third computing device may include an amount authorised for payment, the merchant identifier, the merchant's instrument for receiving payment, and information related to the payment instrument.

At block 818, the transaction server 102 may determine whether the payment was successful, perhaps by receiving a message indicating whether the payment was successful from the third computing device. A successful payment may include successful transfer of funds using the payment instrument associated with the computing device 106 to the payment instrument associated with the merchant (e.g., a bank account). In some examples, the transaction server 102 may be a payment processor configured to access payment instruments respectively associated with the merchant and the computing device 106, and may internally determine whether payment was successful.

Figure 9:
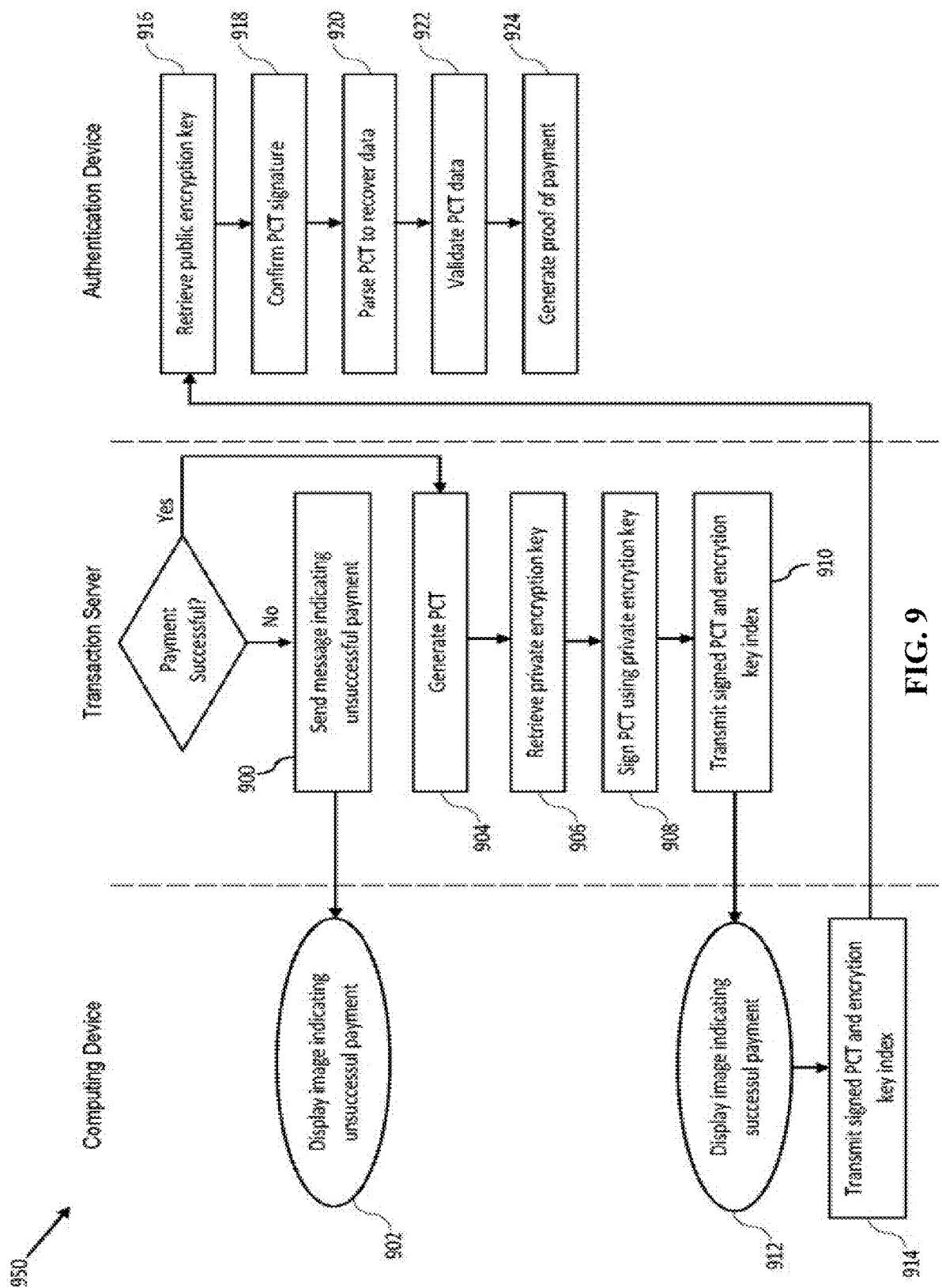
FIG. 9 is a flow chart of functions to carry out payment verification in accordance with an example embodiment of the system of FIG. 1.

FIG. 9 is a flow chart depicting a set of functions 950 that can be carried out in accordance with an example embodiment. The set of functions 950 can be performed to verify that a payment transaction to pay the merchant's bill has completed successfully. The set of functions 950 is shown within blocks 900 to 924.

If the payment transaction is determined to be unsuccessful, the transaction server 102 may, at block 900, generate and transmit a transaction failure notification to the computing device 106. The scanner app 164 (of the computing device 106) may, at block 902, notify the customer that payment has not been successful and to select a different payment instrument and re-attempt payment.

In some embodiments, the transaction failure notification can include an image such as an unsuccessful virtual receipt, such as discussed above in the context of virtual receipts 163. Then, at block 902, the scanner app 164 can notify the customer that payment is unsuccessful by displaying the unsuccessful virtual receipt from the transaction success notification.

If, however, the payment transaction is determined to have completed successfully, the transaction server 102 may, at block 904, generate a file that contains at least (i) the merchant identifier corresponding to the merchant, (ii) the bill identifier corresponding to the bill, and (iii) the total amount due corresponding to the bill. The generated file will be referred to as a "payment confirmation token" (or, more simply, a "PCT"). The data in the PCT is not encrypted.

Next, at block 906, the transaction server 102 may use the encryption key index contained in the payment request received from the computing device 106 as an index to retrieve a private encryption key from the list of private encryption keys 199 in the data storage device 188 of the transaction server. At block 908, the transaction server may digitally sign the data in the PCT using the retrieved private encryption key. In one example, the data in the PCT may be hashed and digitally signed by the transaction server 102 using an Elliptical Curve Digital Signature Algorithm (i.e., "ECDSA"), which is a well-known industry-standard technique. In other examples, the private encryption key can be associated with a merchant and/or other entity receiving a payment as part of the payment transaction. For example, the private encryption key can be owned by, or otherwise associated with, the merchant and/or other entity receiving a payment as part of the payment transaction.

Next, at block 910, the transaction server 102 may transmit a transaction success notification that can include the PCT, the digital signature and the encryption key number to the computing device 106. The scanner app 164 (of the computing device 106) may, at block 912, receive the transaction success notification and notify the customer that payment has been successful. Then, the scanner app 164 can prompt the user to use the computing device 106 to present the received PCT, the digital signature and the encryption key index to the merchant's authentication device 119.

In some embodiments, the transaction success notification can include a successful virtual receipt, such as discussed above in the context of virtual receipts 163. Then, at block 912, the scanner app 164 can notify the customer that payment is successful by displaying the successful virtual receipt received in the transaction success notification.

Next, at block 914, the computing device 106 may transmit part or all of the transaction success notification including the PCT, the digital signature and the encryption key number to the authentication device by means of at least one of the following communication channels: (i) audio communication, (ii) Bluetooth™, (iii) Near Field Communication ("NFC") or, (iv) one or more IEEE 802.11 protocols (e.g., Wi-Fi).

At block 916, the authentication device 119 may receive the transaction success notification that includes the PCT, the digital signature and the encryption key number, and perhaps a successful virtual receipt. Then, the authentication device 119 may use the encryption key index received with the transaction success notification from the computing device 106 as an index to retrieve a public encryption key from the list of public encryption keys 212 in storage device 204 of the authentication device.

As mentioned above, the retrieved public encryption key can be one encryption key of an encryption key pair, where both encryption keys of the encryption key pair can be indexed using the encryption key index. As such, the retrieved public encryption key and the private encryption key used to digitally sign the data in the PCT at block 908 can make up an encryption key pair, where each of the retrieved public encryption key and the private encryption key used to digitally sign the data in the PCT can be respectively indexed using the same encryption key index; i.e., the encryption key index of block 906 can be equal to the encryption key index of block 916.

At block 918, the authentication device 119 may use the retrieved public encryption key to verify the integrity of the PCT by confirming the digital signature of the PCT) (i.e. verifying that the PCT is authentic and has not been tampered with).

Next, if the integrity of the PCT is confirmed, the authentication device 119 may, at block 920, parse the received PCT to recover the various data fields in the token i.e., at least (i) the merchant identifier corresponding to the merchant, (ii) the bill identifier corresponding to the merchant, and (iii) the total amount corresponding to the bill.

At block 922 the merchant may, after validating the data recovered from the PCT, accept the PCT as proof of payment of the merchant's bill by the customer. The authentication device may then, at block 924, generate a hardcopy of the PCT on the output device 108 or save the PCT on a storage device (not shown) as proof of payment.

Clearly, numerous variations and permutations are possible to the embodiments without departing from the scope of this disclosure: Some of these variations and permutations are described below.

1. Digital signature algorithms other than ECDSA can be used by transaction server 102 to sign the PCT. ECDSA, however, yields much smaller signatures resulting from short encryption keys than is achievable by other digital signature algorithms having similar levels of security.

2. In order to prevent potential fraud by replaying (i.e. re-using) a PCT, the POS device 104 or the data analyser device 110 may generate a transaction reference number to be included in the 2D matrix code representing a graphically-encoded and/or non-textual representation of the bill, the merchant identifier and the selected encryption key index. The transaction reference number may be a unique string such as a random number, for example. In some embodiments, the transaction reference number can be included in the above-mentioned billing information; for example, the transaction reference number can be the above-mentioned bill identifier.

The transaction reference number is then forwarded to the transaction server 102 as part of the payment request from the computing device 106, and the transaction server then returns the transaction reference number in the signed PCT. Since only the transaction server 102 has access to the private encryption keys, no-one else can generate such a PCT. The authentication device 119 need only verify that the transaction reference number was included in the PCT to confirm that the PCT is not being replayed.

3. The 2D matrix code representing a graphically-encoded and/or non-textual representation of the bill may include an authentication device identifier, such as a serial number for example, to identify the device that will be used to validate the PCT and confirm payment. The authentication device identifier is then forwarded to the transaction server 102 as part of the payment request from the computing device 106, and the transaction server may then return the authentication device identifier as part of the signed PCT. The returned authentication device identifier may then be used to ensure that only the identified authentication device is able to validate the data recovered from the PCT.

4. The 2D matrix code representing a graphically-encoded and/or non-textual representation of the bill may include a list of communication methods available on the authentication device 119, in order of preference. This list may be used by the scanner app 164 on the computing device 106 to select an appropriate communication channel for transmitting a received PCT to the authentication device.

5. A hacker may perform a man-in-the-middle attack by gaining physical access to the authentication device and replace the public encryption key with the hacker's own public encryption key. This would allow the hacker to generate a PCT with the hacker's own private key and present this to the hacked authentication device. In order to prevent potential fraud by means of such a man-in-the-middle attack, the public encryption keys may be stored securely in the authentication device, for example on a factory-programmed ATMEL ATECC108 ECDSA security device.

6. Prior to presenting a received PCT to the merchant as proof of payment, the scanner app 164 on the computing device 106 may itself also parse the PCT to recover the data in the token for the customer to verify. Furthermore, the scanner app 164 may also verify the integrity of the PCT using a public encryption key that matches the secure private encryption key in the transaction server 102 that was used to sign the PCT.

7. In accordance with the disclosed embodiment, in order to improve security of the system 100, the data contained in the PCT may also be encrypted.

8. In some examples, the POS device 104 may be configured to include the functionality attributed to the authentication device 119, thereby removing the necessity for a separate confirmation device.

9. In some examples, the POS device 104 may be configured to include the functionality attributed to the data analyser device 110, thereby removing the necessity for a separate data analyser.

10. In some examples, the data analyser device 110 may be configured to include the functionality attributed to the authentication device 119, thereby removing the necessity for a separate confirmation device.

11. In some examples, the POS device 114 may be configured to include the functionality attributed to both the authentication device 119 and the data analyser device 110, thereby removing the necessity for a separate confirmation device and a separate data analyser.

12. In accordance with the disclosed embodiments, instead of the transaction server 102 sending the particulars of the payment transaction (for example, the amount due and the payment details) to a payment processor (not shown) for processing, the transaction server 102 may process the payment itself.

13. The computing device 106 may send an additional request to the transaction server 102 for a new PCT for the last transaction, but with new parameters. This may be used, for example, to confirm payment by means of a different authentication device 119 to that identified in the initial payment request transmitted to the transaction server. Such new PCT may include a flag to identify the token as a duplicate.

The system 100 enables a proof-of-payment token to be created on a secure transaction server and to be transmitted to a beneficiary (i.e. a merchant) via a customer device. The proof-of-payment token can only be created by an authorised transaction server that has access to a secure private encryption key. The proof-of-payment token cannot be created by an entity other than the authorised transaction server; it cannot be modified by an entity other than the authorised transaction server, and cannot be substituted by an entity other than the authorised transaction server.

In the example embodiment, such proof-of-payment tokens are used in a commercial environment. Three entities are involved in the payment transaction:
    i. a merchant (i.e. the beneficiary), which can be associated with a merchant device;
    ii. a customer (i.e., the paying entity), which can be associated with a customer device; and
    iii. a transaction server.

As one example, the merchant device can include the herein-described functionality of the POS device 104, the output device 108, the data analyser device 110, and/or the authentication device 119. As a second example, the customer device can include the herein-described functionality of the computing device 106. As a third example, the transaction server can include the herein-described functionality of the transaction server 102. Other examples are possible as well.

Each of these entities and associated devices can play a specific role and perform specific functions, namely:
    i. The merchant device:
        a. generates a payment request;
        b. presents the payment request to the customer device;
        c. receives a returned payment confirmation token;
        d. verifies and validates token contents using a public key; and
        e. saves and/or prints the contents of the token.
    ii. The customer device:
        a. receives a payment request from the merchant device;
        b. submits the payment request to a transaction server;
        c. receives a payment confirmation token from the transaction server; and
        d. presents the payment confirmation token to the merchant device.
    iii. The transaction server:
        a. receives a payment request from a customer device;
        b. conducts the payment transaction;
        c. creates a digitally-signed payment confirmation token; and
        d. transmits the payment confirmation token to the customer device.

The merchant device is thus able to securely authenticate the payment confirmation token without requiring a network connection. The method described in this embodiment may be used to create secure payment confirmation tokens that can be verified offline by a merchant-owned authentication device.

In other applications, the system 100 may also be used to validate digital tickets, vouchers and the like.

Figure 10:
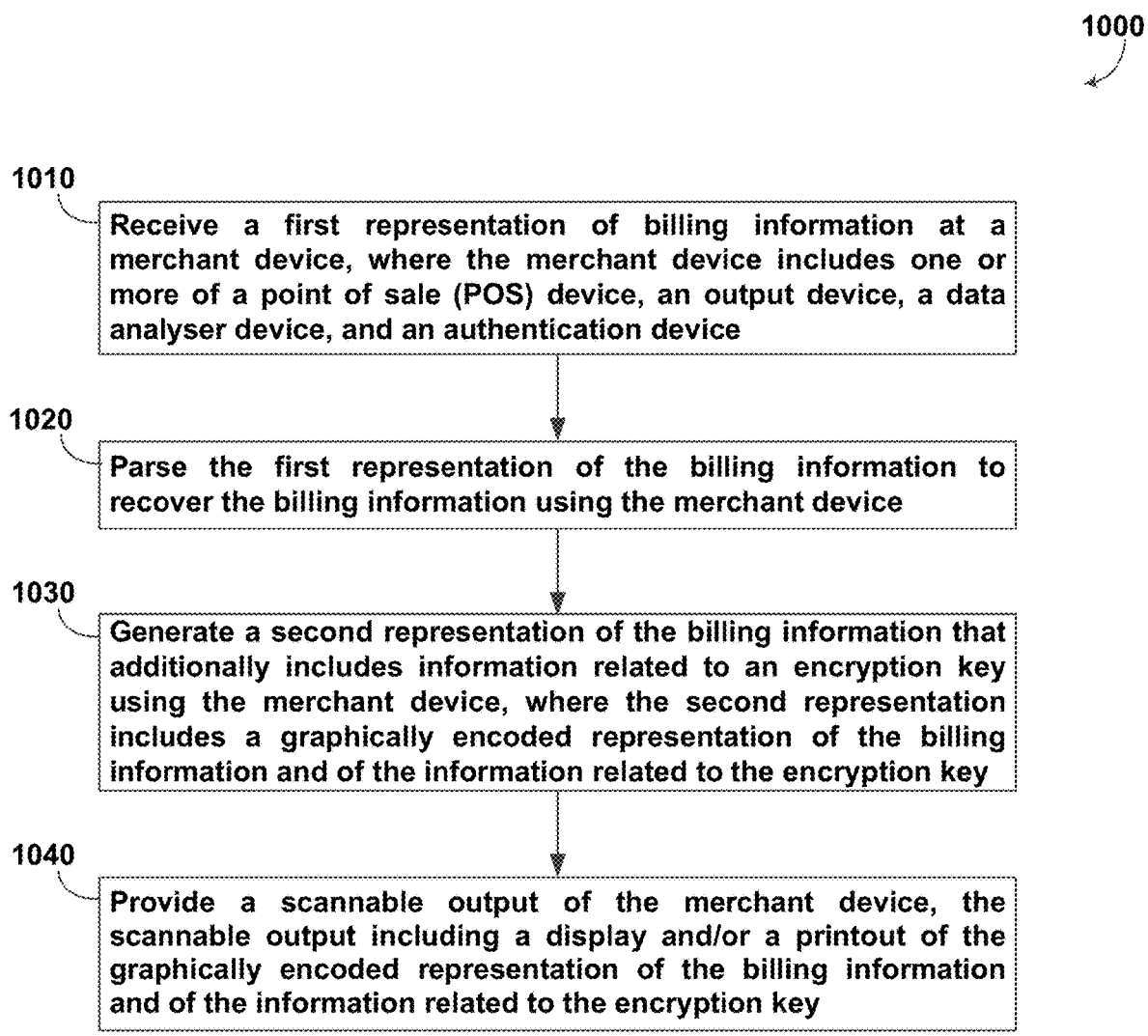
FIG. 10 is a flow chart of functions to carry out a method, in accordance with an example embodiment.

FIG. 10 is a flow chart depicting a set of functions 1000 that can be carried out in accordance with an example embodiment. FIG. 10 shows set of functions 1000 within blocks 1010 to 1040.

The set of functions 1000 can be carried out by a computing device, such as a merchant device. The merchant device can include one or more of: POS device 104, output device 108, data analyser device 110, and authentication device 119. For example, the merchant device can include one or more processors and data storage, such as discussed above at least in the context of data analyser device 110 of FIG. 5 and authentication device 119 of FIG. 6. The data storage can store computer-readable program instructions, such as CRPI 178 and/or analyser app 210 of data analyser device 110 and/or CRPI 208 and/or authentication app 210 of authentication device 119. The computer-readable program instructions can, when executed by the processor(s) of the merchant device can cause the merchant device to perform functions. These functions include, but are not limited to, the set of functions 1000 illustrated by FIG. 10.

FIG. 10 indicates that set of functions 1000 can begin at block 1010. At block 1010, the merchant device can receive a first representation of billing information. For example, the first representation can be a file, such as discussed above at least in the context of the set of functions 750 of FIG. 7; e.g., at least block 704. As mentioned in the paragraph immediately above, the merchant device can include one or more of a point of sale (POS) device, an output device, a data analyser device, and an authentication device.

In some embodiments, the billing information can include one or more of: a bill identifier, a merchant identifier, an employee identifier, a location identifier, information about goods and/or services being billed, an amount due, and a table identifier, such as discussed above at least in the context of set of functions 750 of FIG. 7; e.g., at least block 700.

In other embodiments, the first representation of the billing information can include a textual representation of the billing information formatted using a bill template, such as discussed above at least in the context of bill template 183 of FIG. 4 and block 700 of set of functions 750 of FIG. 7.

At block 1020, the merchant device can parse the first representation of the billing information to recover the billing information, such as discussed above at least in the context of the set of functions 750 of FIG. 7; e.g., at least block 706.

At block 1030, the merchant device can generate a second representation of the billing information that additionally includes information related to an encryption key, where the second representation can include a graphically encoded representation of the billing information and of the information related to the encryption key, such as discussed above at least in the context of the set of functions 750 of FIG. 7; e.g., at least block 712.

In other embodiments, the information related to the encryption key can include an encryption key index for the encryption key. In these embodiments, generating the second representation can include selecting the encryption key index, such as discussed above at least in the context of at least block 710 of set of functions 750 of FIG. 7.

In particular of these embodiments, the encryption key can be (or include) one encryption key of a number N of encryption keys. Then, selecting the encryption key index can include determining the encryption key index based on an integer randomly selected between 1 and the number N of encryption keys, such as discussed above at least in the context of at least block 710 of set of functions 750 of FIG. 7.

At block 1040, the merchant device can generate a scannable output. The scannable output can include a display and/or a printout of the graphically encoded representation of the billing information and of the information related to the encryption key, such as discussed above at least in the context of the set of functions 750 of FIG. 7; e.g., at least block 718.

In some embodiments, the merchant device can include the data analyser device and the output device. Then, receiving the first representation of billing information can include receiving the first representation of billing information at the data analyser device; parsing the first representation of the billing information can include parsing the first representation of the billing information using the data analyser device; generating the second representation of the billing information can include generating the second representation of the billing information using the data analyser device, and providing the output of the merchant device can include providing the output of the merchant device using the output device, such as discussed above at least in the context of the set of functions 750 of FIG. 7; e.g., at least at blocks 704, 706, 712, and 718.

In other embodiments, the billing information can be related to a payment transaction. Then, set of functions 1000 can additionally include: receiving, at the merchant device, an indication indicating successful completion of the payment transaction, such as discussed above at least in the context of the set of functions 950 of FIG. 9; e.g., at least block 916. In particular of these embodiments, the indication indicating successful completion of the payment transaction can include one or more of: a virtual receipt for the payment transaction and a payment confirmation token, such as discussed above at least in the context of the set of functions 950 of FIG. 9; e.g., at least blocks 910 and 916. In other particular embodiments, set of functions 1000 can further include: verifying the indication indicating successful completion of the payment transaction using a public encryption key associated with the information related to an encryption key and saving the verified indication indicating successful completion of the payment transaction using the merchant device, such as discussed above at least in the context of the set of functions 950 of FIG. 9; e.g., at least blocks 916, 918, and 924. In still other particular embodiments, the information related to an encryption key can include an encryption key index that refers to an encryption key pair, and the encryption key pair can include the public encryption key, such as discussed above at least in the context of the set of functions 710 of FIG. 7; e.g., at least block 710.

Figure 11:
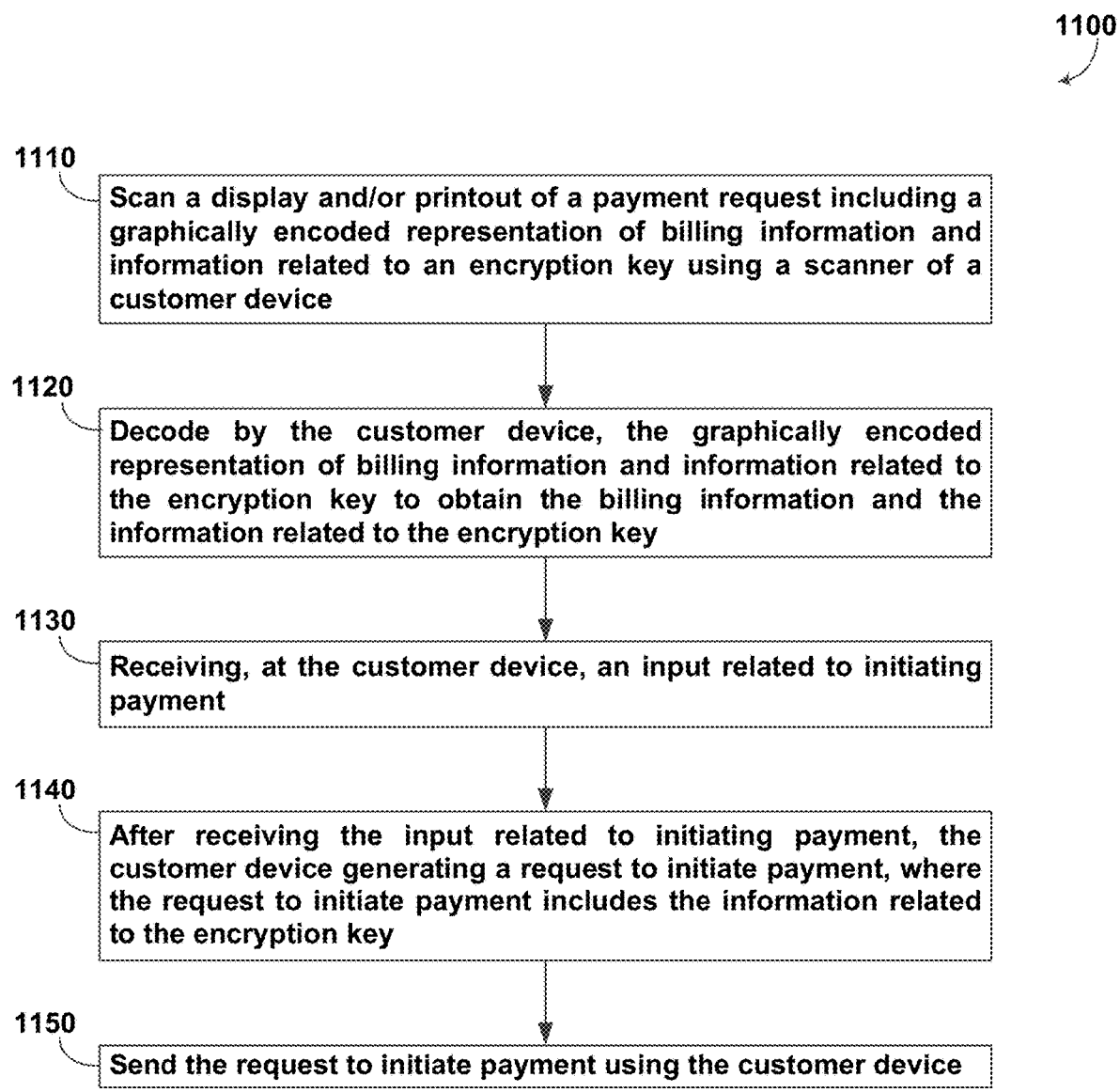
FIG. 11 is a flow chart of functions to carry out a method, in accordance with an example embodiment.

FIG. 11 is a flow chart depicting a set of functions 1100 that can be carried out in accordance with an example embodiment. FIG. 11 shows set of functions 1100 within blocks 1110 to 1150.

The set of functions 1100 can be carried out by a computing device, such as a customer device. For example, the customer device can be embodied by computing device 106 of FIG. 3. The customer device can include one or more processors and data storage, such as discussed above at least in the context of computing device 106. The data storage can store computer-readable program instructions, such as CRPI 162 and/or scanner app 164 of computing device 106. The computer-readable program instructions can, when executed by the processor(s) of the customer device can cause the customer device to perform functions. These functions include, but are not limited to, the set of functions 1100 illustrated by FIG. 11. The customer device can include a scanner, such as scanner 156 discussed above in the context of at least FIG. 3.

FIG. 11 indicates that set of functions 1100 can begin at block 1110. At block 1110, the customer device, which can include a scanner, can use the scanner to scan a display and/or a printout of a payment request that includes a graphically encoded representation of billing information and information related to an encryption key, such as discussed above at least in the context of the set of functions 850 of FIG. 8; e.g., at least block 800.

In some embodiments, the billing information can include one or more of: a bill identifier, a merchant identifier, an employee identifier, a location identifier, information about goods and/or services being billed, an amount due, and a table identifier, such as discussed above at least in the context of the set of functions 850 of FIG. 8; e.g., at least block 800.

In other embodiments, the information related to the encryption key can include an encryption key index for the encryption key, such as discussed above at least in the context of the set of functions 850 of FIG. 8; e.g., at least block 800.

At block 1120, the customer device can decode the graphically encoded representation of billing information and information related to the encryption key to obtain the billing information and the information related to the encryption key, such as discussed above at least in the context of the set of functions 850 of FIG. 8; e.g., at least block 802.

At block 1130, the customer device can receive an input related to initiating payment, such as discussed above at least in the context of the set of functions 850 of FIG. 8; e.g., at least block 810.

In some embodiments, receiving the input related to initiating payment can include: displaying at least some of the billing information using the customer device; and after displaying the at least some of the billing information, receiving the input related to initiating payment of the payment request, such as discussed above at least in the context of the set of functions 850 of FIG. 8; e.g., at least blocks 804, 806, and 810.

In other embodiments, receiving the input related to initiating payment can include: receiving an input identifying a payment instrument suitable for making the payment of the payment request, and after receiving the input identifying the payment instrument, receiving the input related to initiating payment of the payment request, such as discussed above at least in the context of the set of functions 850 of FIG. 8; e.g., at least blocks 808 and 810. In particular of these embodiments, the request to initiate payment using the customer device can further include information about the identified payment instrument, such as discussed above at least in the context of the set of functions 850 of FIG. 8; e.g., at least block 812.

In still other embodiments, receiving the input identifying the payment instrument can include: displaying a plurality of display icons related to a corresponding plurality of payment instruments using the customer device, where the plurality of display icons include a particular display icon associated with the identified payment instrument; and receiving, at the customer device, an input indicating selection of the particular display icon, such as discussed above at least in the context of the set of functions 850 of FIG. 8; e.g., at least block 808. In particular of these embodiments, receiving the input indicating selection of the particular display icon can include receiving the input indicating selection of the particular display icon using a touch screen of the customer device, such as discussed above at least in the context of the set of functions 850 of FIG. 8; e.g., at least block 808.

At block 1140, the customer device can, after receiving the input related to initiating payment, generate a request to initiate payment that can include the information related to the encryption key, such as discussed above at least in the context of the set of functions 850 of FIG. 8; e.g., at least block 812. In the context of block 812, the information related to the encryption key can include the encryption key index.

In some embodiments, the request to initiate payment can include the bill identifier, the merchant identifier, the amount due to be paid, a bill identifier, and information related to a payment instrument, such as discussed above at least in the context of the set of functions 850 of FIG. 8; e.g., at least block 812.

At block 1150, the customer device can send the request to initiate payment, such as discussed above at least in the context of the set of functions 850 of FIG. 8; e.g., at least block 812.

In some embodiments, the set of functions 1100 can further include: after sending the request to initiate payment, receiving a payment confirmation token at the customer device; and sending the received payment confirmation token from the customer device, such as discussed above at least in the context of the set of functions 950 of FIG. 9; e.g., at least blocks 912 and 914.

In other embodiments, the set of functions 1100 can further include: after sending the request to initiate payment, the customer device receiving a notification related to the request to initiate payment; and generating a display based on the notification using the customer device, such as discussed above at least in the context of the set of functions 950 of FIG. 9; e.g., at least blocks 910 and 912. In these embodiments in particular, the notification related to the request to initiate payment can include a virtual receipt. Then, generating the display based on the notification can include generating a display of the virtual receipt, such as discussed above at least in the context of the set of functions 950 of FIG. 9; e.g., at least block 912. In other particular embodiments, the notification related to the request to initiate payment can include a payment confirmation token, a digital signature associated with the information related to the encryption key, and the information related to the encryption key, such as discussed above at least in the context of the set of functions 950 of FIG. 9; e.g., at least blocks 910 and 912.

In still other embodiments, the set of functions 1100 can further include: sending the payment confirmation token from the customer device, such as discussed above at least in the context of the set of functions 950 of FIG. 9; e.g., at least block 914.

Figure 12:
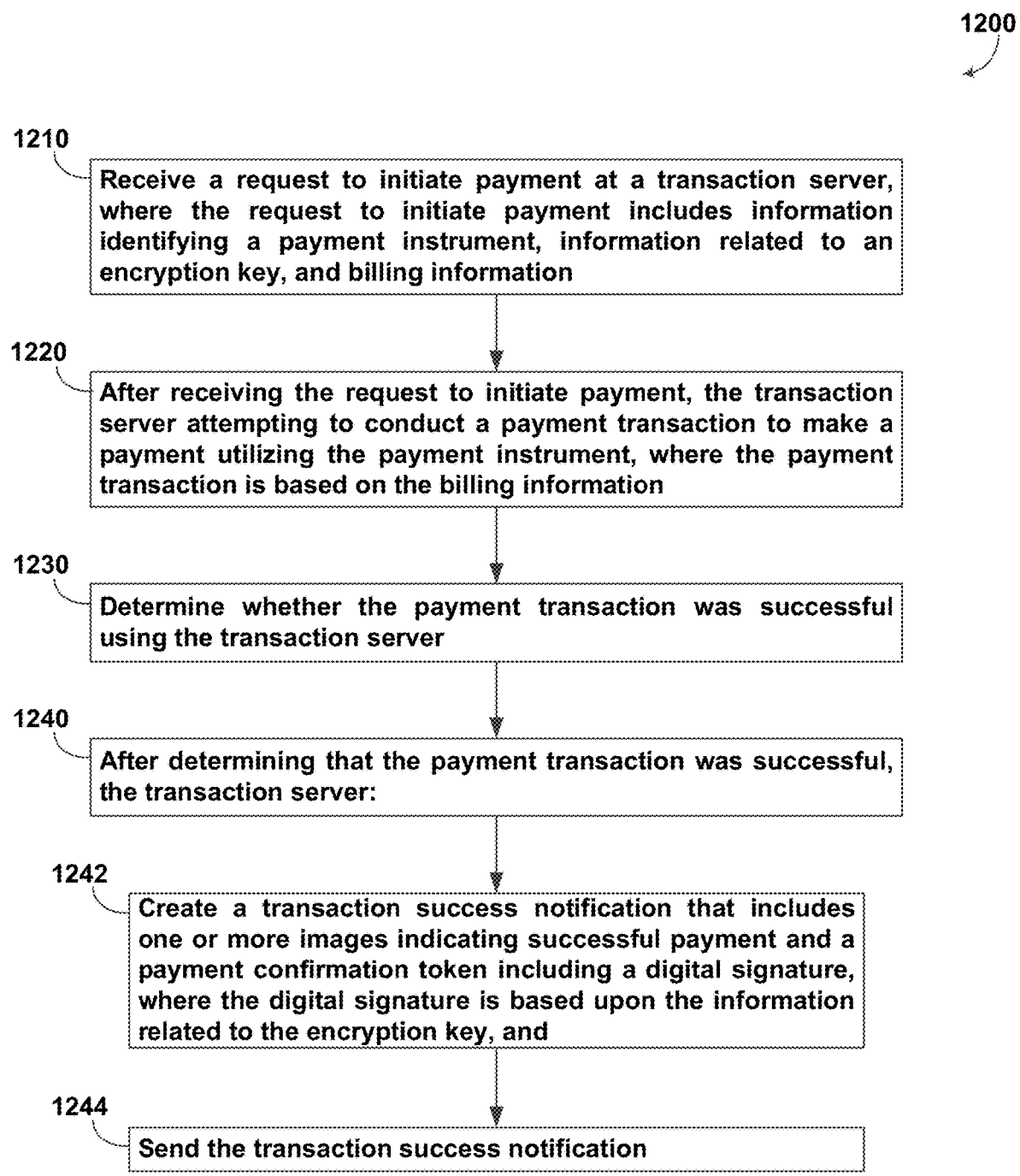
FIG. 12 is a flow chart of functions to carry out a method, in accordance with an example embodiment.

FIG. 12 is a flow chart depicting a set of functions 1200 that can be carried out in accordance with an example embodiment. FIG. 12 shows set of functions 1200 within blocks 1210 to 1244.

The set of functions 1200 can be carried out by a computing device, such as a transaction server. For example, the customer device can be embodied by transaction server 102 of FIG. 6. The transaction server can include one or more processors and data storage, such as discussed above at least in the context of transaction server 102. The data storage can store computer-readable program instructions, such as CRPI 192 and/or scanner app 194 of transaction server 102. The computer-readable program instructions can, when executed by the processor(s) of the transaction server, cause the transaction server to perform functions. These functions include, but are not limited to, the set of functions 1200 illustrated by FIG. 12.

FIG. 12 indicates that set of functions 1200 can begin at block 1210. At block 1210, the transaction server can receive a request to initiate payment, where the request to initiate payment can include information identifying a payment instrument, information related to an encryption key, and billing information, such as discussed above at least in the context of the set of functions 850 of FIG. 8; e.g., at least blocks 812 and 814.

At block 1220, the transaction server can, after receiving the request to initiate payment, attempt to conduct a payment transaction to make a payment, where the payment transaction can utilize the payment instrument, and where the payment transaction can be based on the billing information, such as discussed above at least in the context of the set of functions 850 of FIG. 8; e.g., at least block 816.

At block 1230, the transaction server can determine whether the payment transaction was successful, such as discussed above at least in the context of the set of functions 850 of FIG. 8; e.g., at least block 818.

At block 1240, the transaction server can, after determining that the payment transaction was successful, carry out the procedures of blocks 1242 and 1244, such as discussed above at least in the context of the set of functions 950 of FIG. 9; e.g., at least blocks 900 and 904.

At block 1242, the transaction server can create a transaction success notification that includes one or more images indicating successful payment and a payment confirmation token including a digital signature, where the digital signature is based upon the information related to the encryption key, such as discussed above at least in the context of the set of functions 950 of FIG. 9; e.g., at least blocks 904, 906, and 908.

In some embodiments, creating the transaction success notification can include: retrieving a stored encryption key based on the information related to the encryption key using the transaction server; and generating the digital signature utilizing the stored encryption key using the transaction server, such as discussed above at least in the context of the set of functions 950 of FIG. 9; e.g., at least blocks 906 and 908. In particular of these embodiments, the stored encryption key can include a private encryption key associated with an entity receiving a payment as part of the payment transaction, such as discussed above at least in the context of the set of functions 950 of FIG. 9; e.g., at least block 906.

In other embodiments, where the payment confirmation token is based upon a transaction reference number included in the billing information, such as discussed above at least in the context of the set of functions 950 of FIG. 9; e.g., at least in the context of variations and permutations #2 discussed after block 924.

At block 1244, the transaction server can send the transaction success notification, such as discussed above at least in the context of the set of functions 950 of FIG. 9; e.g., at least block 910. In some embodiments, the one or more images indicating successful payment can include a successful virtual receipt, such as discussed above at least in the context of the set of functions 950 of FIG. 9; e.g., at least block 910.

In some embodiments, determining whether the payment transaction was successful includes determining whether the payment transaction was either successful or unsuccessful, such as discussed above at least in the context of the set of functions 950 of FIG. 9; e.g., at least blocks 900 and 904. In these context, the set of functions 1200 can further include: after determining that the payment transaction was unsuccessful using the transaction server, the transaction server can generate and send a transaction failure notification, where the transaction failure notification can include an unsuccessful virtual receipt, such as discussed above at least in the context of the set of functions 950 of FIG. 9; e.g., at least block 900.

IV. Additional Example Embodiments

The following clauses are offered as further description of the disclosure.

Clause 1—A method comprising: receiving a first representation of billing information at a merchant device, wherein the merchant device comprises one or more of a POS device, an output device, a data analyser device, and an authentication device; parsing the first representation of the billing information to recover the billing information using the merchant device; generating a second representation of the billing information that additionally comprises information related to an encryption key using the merchant device, wherein the second representation includes a graphically encoded representation of the billing information and of the information related to the encryption key; and providing a scannable output of the merchant device, the scannable output comprising a display and/or a printout of the graphically encoded representation of the billing information and of the information related to the encryption key.

Clause 2—The method of Clause 1, wherein the billing information comprises one or more of: a bill identifier, a merchant identifier, an employee identifier, a location identifier, information about goods and/or services being billed, an amount due, and a table identifier.

Clause 3—The method of one of Clause 1 or Clause 2, wherein the merchant device comprises the data analyser device and the output device, wherein receiving the first representation of billing information comprises receiving the first representation of billing information at the data analyser device, wherein parsing the first representation of the billing information comprises parsing the first representation of the billing information using the data analyser device, wherein generating the second representation of the billing information comprises generating the second representation of the billing information using the data analyser device, and wherein providing the output of the merchant device comprises providing the output of the merchant device using the output device.

Clause 4—The method of one of Clauses 1-3, wherein the first representation of the billing information comprises a textual representation of the billing information formatted using a bill template.

Clause 5—The method of one of Clauses 1-4, wherein the information related to the encryption key comprises an encryption key index for the encryption key, and wherein generating the second representation comprises selecting the encryption key index.

Clause 6—The method of Clause 5, wherein the encryption key is one encryption key of a number N of encryption keys, and wherein selecting the encryption key index comprises: determining the encryption key index based on an integer randomly selected between 1 and the number N of encryption keys.

Clause 7—The method of one of Clauses 1-6, wherein the billing information is related to a payment transaction, and wherein the method further comprises: receiving, at the merchant device, an indication indicating successful completion of the payment transaction.

Clause 8—The method of Clause 7, wherein the indication indicating successful completion of the payment transaction comprises one or more of: a virtual receipt for the payment transaction and a payment confirmation token.

Clause 9—The method of one of Clause 7 and Clause 8, further comprising: verifying the indication indicating successful completion of the payment transaction using a public encryption key associated with the information related to an encryption key; and saving the verified indication indicating successful completion of the payment transaction using the merchant device.

Clause 10—The method of Clause 9, wherein the information related to an encryption key comprises an encryption key index that refers to an encryption key pair, and wherein the encryption key pair comprises the public encryption key.

Clause 11—A merchant device comprising: a processor; and a data storage device configured to store at least computer-readable program instructions that, when executed by the processor, cause the merchant device to carry out the method of one of Clauses 1-10.

Clause 12—A computer-readable medium configured to store instructions that, when executed by a processor of a merchant device, cause the merchant device to carry out the method of one of Clauses 1-10.

Clause 13—A method, comprising: scanning a display and/or a printout of a payment request comprising a graphically encoded representation of billing information and information related to an encryption key using a scanner of a customer device; decoding, by the customer device, the graphically encoded representation of billing information and information related to the encryption key to obtain the billing information and the information related to the encryption key; receiving, at the customer device, an input related to initiating payment; after receiving the input related to initiating payment, the customer device generating a request to initiate payment that comprises the information related to the encryption key; and sending the request to initiate payment using the customer device.

Clause 14—The method of Clause 13, further comprising: after sending the request to initiate payment, receiving a payment confirmation token at the customer device; and sending the received payment confirmation token from the customer device.

Clause 15—The method of one of Clause 13 or Clause 14, wherein receiving the input related to initiating payment comprises: displaying at least some of the billing information using the customer device; and after displaying the at least some of the billing information, receiving the input related to initiating payment of the payment request.

Clause 16—The method of one of Clauses 13-15 wherein receiving the input related to initiating payment comprises: receiving an input identifying a payment instrument suitable for making the payment of the payment request, and after receiving the input identifying the payment instrument, receiving the input related to initiating payment of the payment request.

Clause 17—The method of Clause 16, wherein the request to initiate payment using the customer device further comprises information about the identified payment instrument.

Clause 18—The method of either Clause 16 or 17, wherein receiving the input identifying the payment instrument comprises: displaying a plurality of display icons related to a corresponding plurality of payment instruments using the customer device, wherein the plurality of display icons comprise a particular display icon associated with the identified payment instrument; and receiving, at the customer device, an input indicating selection of the particular display icon.

Clause 19—The method of Clause 18, wherein receiving the input indicating selection of the particular display icon comprises receiving the input indicating selection of the particular display icon using a touch screen of the customer device.

Clause 20—The method of one of Clauses 13-19, wherein the billing information comprises one or more of: a bill identifier, a merchant identifier, an employee identifier, a location identifier, information about goods and/or services being billed, an amount due, and a table identifier.

Clause 21—The method of Clause 20, wherein the request to initiate payment comprises the bill identifier, the merchant identifier, the amount due to be paid, a bill identifier, and information related to a payment instrument.

Clause 22—The method of one of Clauses 13-21, wherein the information related to the encryption key comprises an encryption key index for the encryption key.

Clause 23—The method of one of Clauses 13-22, further comprising: after sending the request to initiate payment, the customer device receiving a notification related to the request to initiate payment; and generating a display based on the notification using the customer device.

Clause 24—The method of Clause 23, wherein the notification related to the request to initiate payment comprises a virtual receipt, and where generating the display based on the notification comprises generating a display of the virtual receipt.

Clause 25—The method of one of Clause 23 and Clause 24, wherein the notification related to the request to initiate payment comprises a payment confirmation token, a digital signature associated with the information related to the encryption key, and the information related to the encryption key.

Clause 26—The method of Clause 25, further comprising: sending the payment confirmation token from the customer device.

Clause 27—A customer device, comprising: a processor; a scanner; and a data storage device configured to store at least computer-readable program instructions that, when executed by the processor, cause the customer device to carry out the method of one of Clauses 13-26.

Clause 28—A computer-readable medium configured to store instructions that, when executed by a processor of a customer device, cause the customer device to carry out the method of one of Clauses 13-26.

Clause 29—A method, comprising: receiving a request to initiate payment at a transaction server, wherein the request to initiate payment comprises information identifying a payment instrument, information related to an encryption key, and billing information; after receiving the request to initiate payment, the transaction server attempting to conduct a payment transaction to make a payment utilizing the payment instrument, wherein the payment transaction is based on the billing information; determining whether the payment transaction was successful using the transaction server; and after determining that the payment transaction was successful, the transaction server: creating a transaction success notification that includes one or more images indicating successful payment and a payment confirmation token including a digital signature, wherein the digital signature is based upon the information related to the encryption key, and sending the transaction success notification.

Clause 30—The method of Clause 29, wherein creating the transaction success notification comprises: retrieving a stored encryption key based on the information related to the encryption key using the transaction server; and generating the digital signature utilizing the stored encryption key using the transaction server.

Clause 31—The method of Clause 30, wherein the stored encryption key comprises a private encryption key associated with an entity receiving a payment as part of the payment transaction.

Clause 32—The method of Clause 30 or Clause 31, wherein the payment confirmation token is based upon a transaction reference number included in the billing information.

Clause 33—The method of any of Clauses 29-32, wherein the one or more images indicating successful payment comprise a successful virtual receipt.

Clause 34—The method of any one of Clauses 29-33, wherein determining whether the payment transaction was successful comprises determining whether the payment transaction was either successful or unsuccessful, and wherein the method further comprises: after determining that the payment transaction was unsuccessful, the transaction server: generating a transaction failure notification; and sending the transaction failure notification, wherein the transaction failure notification comprises an unsuccessful virtual receipt.

Clause 35—A transaction server, comprising: a processor; and a data storage device configured to store at least computer-readable program instructions that, when executed by the processor, cause the transaction server to carry out the method of one of Clauses 29-34.

Clause 36—A computer-readable medium configured to store instructions that, when executed by a processor of a transaction server, cause the transaction server to carry out the method of one of Clauses 29-34.

V. Conclusion

Example embodiments have been described above. Those skilled in the art will understand that changes and modifications can be made to the described embodiments without departing from the true scope of the described embodiments as claimed.

This detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be used, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including in substantially concurrent or in reverse order, depending on the functionality involved. Further, more or fewer steps, blocks and/or functions can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer-readable medium such as a storage device including a disk or hard drive or other storage media.

The computer-readable medium can include non-transitory computer-readable media such as computer-readable media that stores data for short periods of time like register memory, processor cache, and/or random access memory (RAM). The computer-readable media can include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media can be any other volatile or non-volatile storage systems. A computer-readable medium can be considered a computer-readable storage medium, for example, or a tangible storage device.

Software for use in carrying out the herein-described embodiments can also be in transitory form, for example in the form of signals transmitted over a network such as the Internet. Moreover, a step or block that represents one or more information transmissions can correspond to information transmissions between software and/or hardware modules in the same physical device. However, other information transmissions can be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. A method performed by a merchant device, the method comprising:
 receiving a first representation of a billing information, wherein the merchant device comprises one or more of a point of sale (POS) device, an output device, a data analyser device, or an authentication device;
 parsing the first representation of the billing information to recover the billing information;

selecting a particular encryption key index from among a plurality of encryption key indices, wherein the particular encryption key index identifies a particular encryption key pair that includes a public encryption key and a private encryption key from among a set of encryption keys that are indexed by the plurality of encryption key indices, wherein the private encryption key is configured to be used to sign a payment confirmation token and the public encryption key is configured to be used to verify that the payment confirmation token was signed by the private encryption key;

generating a second graphically encoded representation of the billing information and of the particular encryption key index; and providing a scannable output of the merchant device, the scannable output comprising a display and/or a printout of the second graphically encoded representation of the billing information and of the particular encryption key index.

2. The method of claim 1, wherein the merchant device comprises the data analyser device and the output device,
wherein receiving the first representation of the billing information comprises receiving the first representation of the billing information at the data analyser device,
wherein parsing the first representation of the billing information comprises parsing the first representation of the billing information using the data analyser device,
wherein generating the second graphically encoded representation of the billing information comprises generating the second graphically encoded representation of the billing information using the data analyser device, and
wherein providing the scannable output of the merchant device comprises providing the scannable output of the merchant device using the output device.

3. The method of claim 1, wherein the first representation of the billing information comprises a textual representation of the billing information formatted using a bill template.

4. The method of claim 1, wherein generating the second graphically encoded representation of the billing information comprises generating a barcode or matrix code that encodes at least the particular encryption key index.

5. The method of claim 1 further comprising:
receiving, at the merchant device, the payment confirmation token.

6. The method of claim 5, further comprising:
using the public encryption key to verify that the payment confirmation token was signed by the private encryption key.

7. The method of claim 1, wherein selecting the particular encryption key index comprises randomly selecting the particular encryption key index.

8. A merchant device comprising:
a processor; and
a data storage device configured to store computer-readable program instructions that, when executed by the processor, cause the merchant device to carry out functions comprising:
receiving a first representation of a billing information;
parsing the first representation of the billing information to recover the billing information;
selecting a particular encryption key index from among a plurality of encryption key indices, wherein the particular encryption key index identifies a particular encryption key pair that includes a public encryption key and a private encryption key from among a set of encryption keys that are indexed by the plurality of encryption key indices, wherein the private encryption key is configured to be used to sign a payment confirmation token and the public encryption key is configured to be used to verify that the payment confirmation token was signed by the private encryption key;

generating a second graphically encoded representation of the billing information and of the particular encryption key index; and providing a scannable output comprising a display and/or a printout of the second graphically encoded representation of the billing information and of the particular encryption key index.

9. The merchant device of claim 8, wherein the billing information comprises one or more of: a bill identifier, a merchant identifier, an employee identifier, a location identifier, information about goods and/or services being billed, an amount due, and a table identifier.

10. The merchant device of claim 8, wherein the merchant device further comprises a data analyser device and an output device,
wherein receiving the first representation of the billing information comprises receiving the first representation of the billing information at the data analyser device,
wherein parsing the first representation of the billing information comprises parsing the first representation of the billing information using the data analyser device,
wherein generating the second graphically encoded representation of the billing information comprises generating the second graphically encoded representation of the billing information using the data analyser device, and
wherein providing the scannable output of the merchant device comprises providing the scannable output of the merchant device using the output device.

11. The merchant device of claim 8, wherein the first representation of the billing information comprises a textual representation of the billing information formatted using a bill template.

12. The merchant device of claim 8, wherein generating the second graphically encoded representation of the billing information comprises generating a barcode or matrix code that encodes at least the particular encryption key index.

13. The merchant device of claim 8, the functions further comprising:
receiving, at the merchant device, the payment confirmation token.

14. The merchant device of claim 13, wherein the functions further comprise:
using the public encryption key to verify that the payment confirmation token was signed by the private encryption key.

15. The merchant device of claim 8, wherein selecting the particular encryption key index comprises randomly selecting the particular encryption key index.

16. A non-transitory computer-readable medium storing instructions that, when executed by a processor of a merchant device, cause the merchant device to carry out functions comprising:
receiving a first representation of a billing information;
parsing the first representation of the billing information to recover the billing information;
selecting a particular encryption key index from among a plurality of encryption key indices, wherein the particular encryption key index identifies a particular encryption key pair that includes a public encryption key and a private encryption key from among a set of encryption keys that are indexed by the plurality of encryption key indices, wherein the private encryption key is configured to be used to sign a payment confirmation token and the public encryption key is configured to be used to verify that the payment confirmation token was signed by the private encryption key;

generating a second graphically encoded representation of the billing information and of the particular encryption key index; and providing a scannable output comprising a display and/or a printout of the second graphically encoded representation of the billing information and of the particular encryption key index.

17. The method of claim 1, wherein the billing information comprises one or more of: a bill identifier, a merchant identifier, an employee identifier, a location identifier, information about goods and/or services being billed, an amount due, and a table identifier.

18. The non-transitory computer-readable medium of claim 16, wherein the merchant device comprises a data analyser device and a output device, wherein receiving the first representation of the billing information comprises receiving the first representation of the billing information at the data analyser device, wherein parsing the first representation of the billing information comprises parsing the first representation of the billing information using the data analyser device, wherein generating the second graphically encoded representation of the billing information comprises generating the second graphically encoded representation of the billing information using the data analyser device, and wherein providing the scannable output of the merchant device comprises providing the scannable output of the merchant device using the output device.

19. The non-transitory computer-readable medium of claim 16, wherein the first representation of the billing information comprises a textual representation of the billing information formatted using a bill template.

20. The non-transitory computer-readable medium of claim 16, wherein selecting the particular encryption key index comprises randomly selecting the particular encryption key index.

\* \* \* \* \*